(12) United States Patent
Prasser et al.

(10) Patent No.: US 11,435,194 B2
(45) Date of Patent: Sep. 6, 2022

(54) SCAFFOLDS FOR GLOBALLY CONSISTENT MAPS

(71) Applicant: UATC, LLC, San Francisco, CA (US)

(72) Inventors: David Prasser, Pittsburgh, PA (US); Evan Herbst, Pittsburgh, PA (US); Robert Zlot, Pittsburgh, PA (US); Jennifer Joyce Padgett, Pittsburgh, PA (US); Bryan John Nagy, Allison Park, PA (US); Xiaodong Zhang, Bentonville, AR (US); Michael Napoli, San Francisco, CA (US); Adrian Rechy Romero, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 267 days.

(21) Appl. No.: 16/774,566

(22) Filed: Jan. 28, 2020

(65) Prior Publication Data

US 2020/0240794 A1 Jul. 30, 2020

Related U.S. Application Data

(60) Provisional application No. 62/797,693, filed on Jan. 28, 2019.

(51) Int. Cl.
*G01C 21/32* (2006.01)
*G05D 1/02* (2020.01)
*G05D 1/00* (2006.01)
*G01C 21/34* (2006.01)

(52) U.S. Cl.
CPC ......... *G01C 21/32* (2013.01); *G01C 21/3446* (2013.01); *G05D 1/0088* (2013.01); *G05D 1/0212* (2013.01); *G05D 2201/0213* (2013.01)

(58) Field of Classification Search
CPC ............... G01C 21/32; G01C 21/3446; G01C 21/3841; G01C 21/3819; G05D 1/0088; G05D 1/0212; G05D 2201/0213
USPC ............... 701/23, 43, 55, 56, 409, 450, 461; 340/990, 995, 995.11
See application file for complete search history.

(56) References Cited

U.S. PATENT DOCUMENTS

| | | | |
|---|---|---|---|
| 2008/0120027 A1* | 5/2008 | Cummings | G01C 21/3446 701/416 |
| 2013/0173152 A1* | 7/2013 | Schilling | G01C 21/3446 701/527 |

(Continued)

*Primary Examiner* — Elaine Gort
*Assistant Examiner* — Ellis B. Ramirez
(74) *Attorney, Agent, or Firm* — Dority & Manning, P.A.

(57) ABSTRACT

A georeferenced trajectory system for vehicles receives trajectory data generated by a plurality of vehicle sensors and scaffolds of previously generated maps and aligns geometry data for a geographic region and trajectory data from the received data from different map builds. A scaffold of a geographic region to be mapped during an initial map build is generated, and the trajectory data from respective map builds is aligned with the scaffold of previously generated maps to generate a map of the geographic region. The resulting map expands the coverage of the existing map such that old and new map data is in a common consistent reference frame whereby the map may be built incrementally by merging or expanding local scaffolds and filling in the merged or expanded scaffold while ensuring global consistency.

20 Claims, 21 Drawing Sheets

(56) References Cited

U.S. PATENT DOCUMENTS

2018/0025235 A1\* 1/2018 Fridman ............ G06K 9/00791
 382/103
2018/0188039 A1\* 7/2018 Chen ......................... G06T 7/73
2020/0201890 A1\* 6/2020 Viswanathan ..... G06K 9/00791

\* cited by examiner

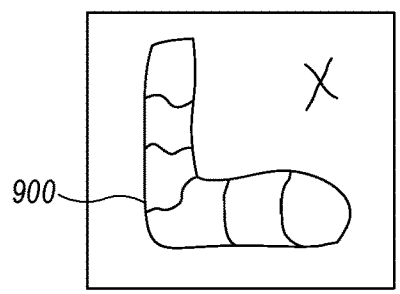
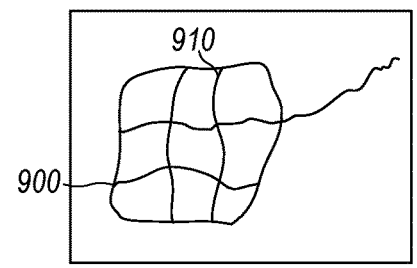
FIG. 9A    FIG. 9B
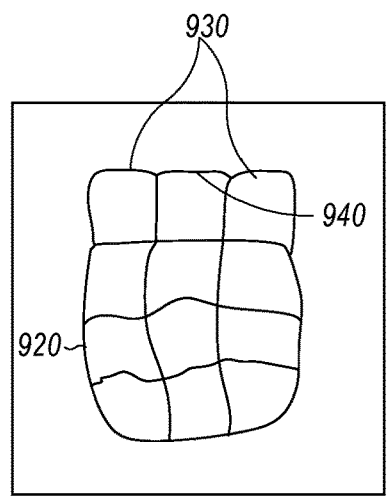
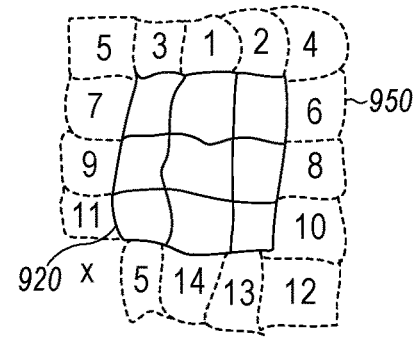
FIG. 9C    FIG. 9D
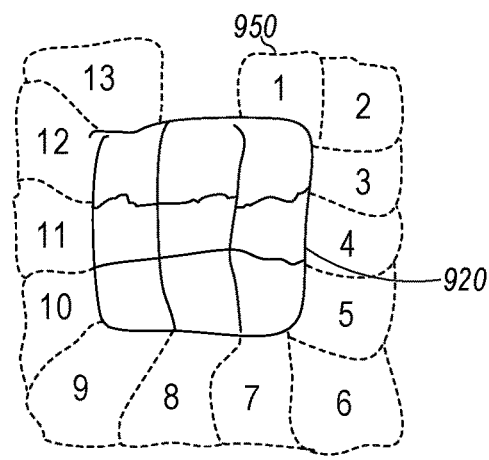
FIG. 9E

SCAFFOLDS FOR GLOBALLY CONSISTENT MAPS

CROSS-REFERENCE TO RELATED APPLICATIONS

The present application claims priority to U.S. Provisional Patent Application Ser. No. 62/797,693, filed Jan. 28, 2019. The contents of that provisional patent application are hereby incorporated by reference.

TECHNICAL FIELD

The disclosure herein is directed to devices, systems, and methods for providing globally consistent maps from trajectory data using scaffolds when developing maps for an autonomous or semi-autonomous vehicle.

BACKGROUND

Autonomous vehicle technology typically relies on the fusion of sensor data to enable a computational control system of the autonomous vehicle to perform perception, prediction, motion planning, and vehicle control operations. A key aspect to autonomous vehicle systems is the continuous determination of the autonomous vehicle's state, which may include the vehicle's position, orientation, trajectory, velocity, etc. with respect to the world around it (e.g., in a common and/or local reference frame). These operations are referred to as localization operations, or the determination of the vehicle's pose. Various methods of localization require the use of a sensor suite, which may comprise any number and type of sensors, such as radar, LIDAR, cameras, sonar, infrared, satellite positioning systems, and inertial measurement unit sensors. Accurate localization may also be aided by preconstructed localization maps that contain detailed prior data of a geographical region in which the autonomous vehicle operates.

The generation of high fidelity localization maps from georeferenced trajectories over a series of time does not in general result in maps that are globally consistent. Graph-based maps—in which smaller components (or submaps) are defined in separate (but relatable) reference frames—may be sufficient for many tasks onboard an autonomous vehicle; however, the absence of global consistency across the trajectories used to generate the maps hinders many offline users that require or prefer global consistency for correctly consuming map data. The lack of global consistency in maps makes the maps unintuitive and may also introduce higher complexity and inaccuracies when performing operations over multiple submaps.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

FIG. 9A illustrates a non-compact scaffold in which the two end points of the scaffold may have larger relative error.

FIG. 9B illustrates the addition of a non-loop extension to the scaffold of FIG. 9A.

FIG. 9C illustrates a scaffold expansion that results in a non-compact scaffold.

FIG. 9D illustrates that the last scaffold expansion is distorted by the accumulated area around the perimeter of the scaffold.

FIG. 9E also illustrates that the last scaffold expansion is distorted by the accumulated area around the perimeter of the scaffold.

FIG. 10 illustrates a potential scaffold plan for San Francisco, Calif. FIG. 10A illustrates a full scaffold, while

DESCRIPTION

Figure 1:
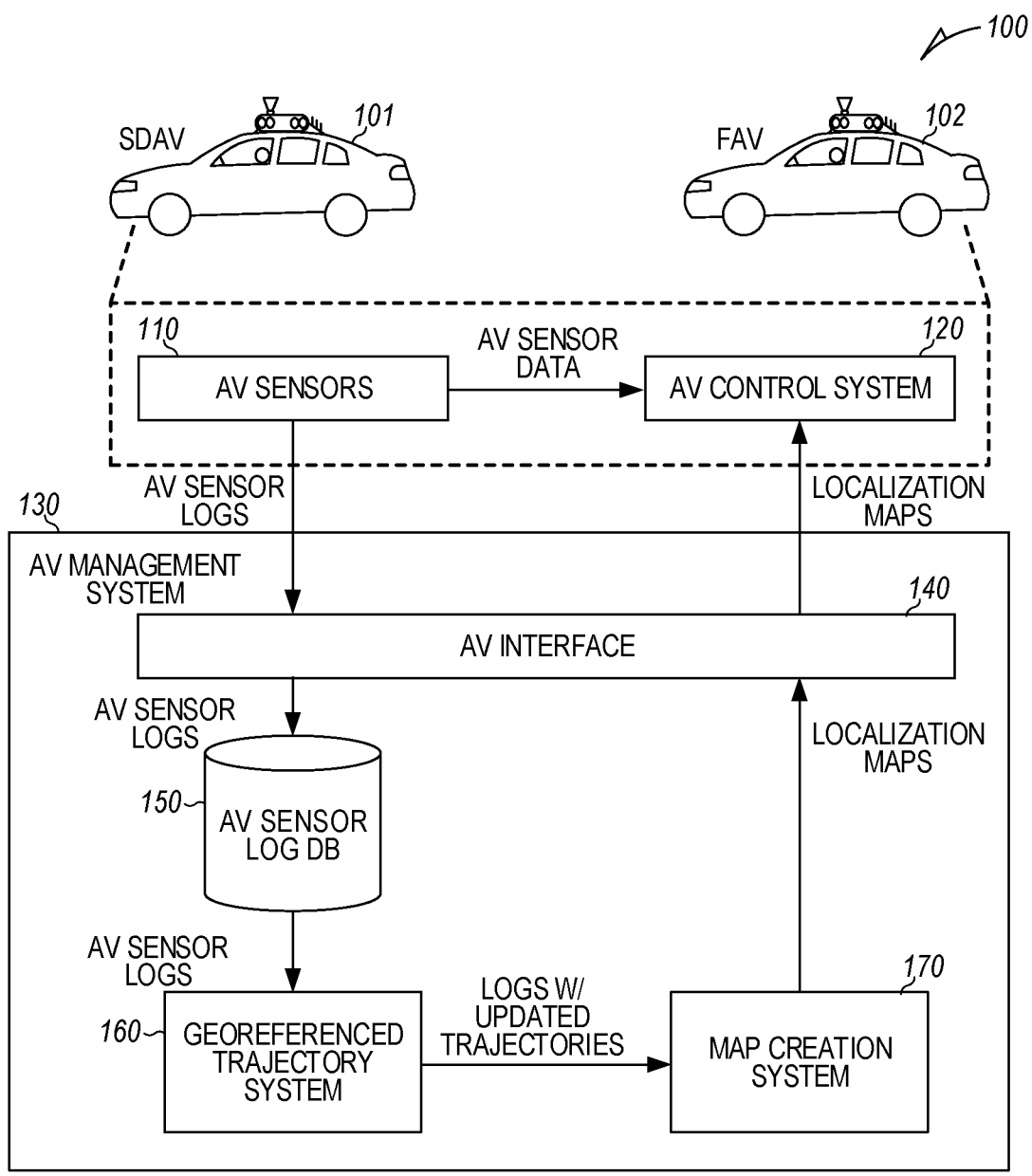
FIG. 1 is a block diagram illustrating autonomous vehicles in communication with an autonomous vehicle management system, according to examples described herein.

It should be understood at the outset that although an illustrative implementation of one or more embodiments are provided below, the disclosed systems and/or methods described with respect to FIGS. 1-16 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Overview

As described herein, an autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information. In an autonomous or semi-autonomous vehicle, an autonomous vehicle (AV) control system controls one or more of the braking, steering, or throttle of the vehicle. In a fully-autonomous vehicle, the AV control system assumes full control of the vehicle. In a semi-autonomous vehicle, the AV control system assumes a portion of the vehicle control, with a human user (e.g., a vehicle operator) still providing some control input.

In order to navigate its surrounding environment, an autonomous vehicle (AV) may include a perception sensor system generating sensor data used to build a sensor view of the environment. The perception sensor system may include any number of cameras (e.g., stereoscopic or monocular cameras), LIDAR sensors, sonar sensors, infrared sensors, radar, inertial measurement units (IMU), encoders (e.g., wheel speed encoders), and/or other types of proximity or imaging sensors. The control system may comprise one or more processors executing an instruction set that causes the control system to process a sensor view generated by the perception sensor system to perform object detection operations and autonomously operate the vehicle's acceleration, braking, and steering systems. In addition, the sensor data generated from the various AV sensors may be logged and uploaded to an AV management system.

To aid in navigating the environment, autonomous vehicles may also rely on preconstructed localization maps that contain detailed prior data. For example, the localization maps may encompass long stretches of highways, city road segments, and the like. In order to create and update these localization maps, the AV management system may use the sensor data that are collected and stored by a fleet of autonomous vehicles and/or human-driven vehicles. Accordingly, the map creation process takes sensor logs, or mapping logs, captured in a target geographic region as input. However, these logs should first be imbued with accurate and consistent trajectories so that the map creation process may subsequently produce the geometric models to which lanes, intersections, and other autonomy-relevant map entities are registered. The map creation process generates new map geometry by identifying the time intervals of sensor logs for a region, registering the associated environment geometry data (e.g., LIDAR points) into a common coordinate frame, and generating a geometric model of the world in that region.

Multiple sets of log data for a single geographic region are combined to generate more accurate localization maps and fill in gaps that may exist in a single log due to obstructions such as other vehicles (either parked or moving), pedestrians, the space underneath the vehicle, etc. However, to be used for autonomous vehicle operation, localization for sensor logs should be accurate within and across multiple logs to the level of centimeters/milliradians.

Generating accurate geometric models relies on the reliability of the trajectories (i.e., sequence of poses) for each of the sensor logs. Repeated visits to the same region minutes or days apart, whether by the same vehicle or different vehicles, need corresponding pose estimates that accurately co-register sensor data such as LIDAR point clouds. Localization for sensor logs should also be globally accurate to the extent that crude road network information maps roughly to where it should within the created localization maps or submaps, and to the extent that reported global positions (in latitude/longitude) are sufficiently accurate for vehicle routing.

Localization mapping systems experience numerous technical challenges, including low-quality and unreliable global navigation satellite system (e.g., GPS, GLONASS, Beidou, and Galileo) data, especially in urban canyons, and the difficulty of aligning LIDAR in dynamic environments. Furthermore, accurate trajectories estimated independently per vehicle log are insufficient because the trajectories would only be accurate in their local coordinate frame. Therefore, each of the vehicle logs in a dataset should be jointly registered into a common coordinate frame, requiring cross-log registration of observed geometry. In addition, pose graph optimization on datasets of this size—many millions of nodes and edges—requires sophisticated techniques. Finally, the final trajectories should be not only accurate and coherent, but also consistent with existing map skeletons (extents from road networks) to within bounds acceptable to map production policies, which is a challenge since these skeletons are not directly observable from sensor data.

Among other advantages, a georeferenced trajectory system such as described herein is able to produce trajectories uniformly more suited to map creation by using the same source sensor (e.g., LIDAR unit on a given AV) that generated the data to be co-registered to also help estimate the trajectory. In addition, aligning data across multiple logs early in the map creation process may average out systematic error from low quality GPS data.

While maps created from conventional trajectory systems are sufficient for many tasks onboard an autonomous vehicle, the lack of global consistency in such maps may hinder many offline users that require or prefer global consistency for correctly consuming the map data. The lack of global consistency may also affect online operations such as routing. Basically every operation that is not contained within a single submap (which might just be a couple of blocks) is much more complicated to do without global consistency. The creation of globally consistent maps as further described herein enables the exploration of different map representations and allows realistic simulation environments to be provided. Systems and methods for creating globally consistent maps as described herein tie all map builds for a given geography together into a statistically cohesive framework by providing historical information from previous map sessions while also inferring trajectories from raw sensor data (cameras, GPS, IMU, encoder, LIDAR) in unmapped areas. Additionally, the framework may also incorporate global accuracy through the addition of survey points. The systems and methods described herein are made more robust by anchoring the map solution relative to known survey points for global accuracy. Key benefits of the systems and methods described herein to downstream users include a wider variety of map representations such as submaps, decompositions of maps into arbitrary spatially indexed containers (e.g., S2 cells, H3 cells, submaps, etc.), more flexible visual rendering of maps, and the ability to use maps in simulations.

In sample embodiments, a georeferenced trajectory system for autonomous vehicles and semi-autonomous vehicles is provided that includes a memory to store instructions and one or more processors using the instructions stored in the memory to perform operations including receiving data generated by a plurality of vehicle sensors of a plurality of vehicles; identifying, from the received data, a first set of sensor measurements for a geographic region taken by a first vehicle over a first period of time, the first set of sensor measurements including (i) first environment geometry data for the geographic region, and (ii) first trajectory data for the first vehicle; identifying, from the received data, a second set of sensor measurements for the geographic region taken by a second vehicle over a second period of time, the second set of sensor measurements including (i) second environment geometry data for the geographic region, and (ii) second trajectory data, not aligned with the first trajectory data, for the second vehicle; aligning the first environment geometry data with the second environment geometry data; and based on the alignment of the first environment geometry data with the second environment geometry data, transforming the first trajectory data and the second trajectory data into a common coordinate frame. The common coordinate frame is used to generate a map that is used to navigate an autonomous or semi-autonomous vehicle. To provide consistent maps, the common coordinate frame persistent in the map is solved for by aligning to the existing map.

In sample embodiments, in order to get each map to a single globally consistent coordinate frame with low geometric error, a scaffold may be provided. As used herein, a scaffold is a skeleton-like subset of the road graph that will be built before the rest of the map as a geometrically sparse but globally consistent section of map that may be used as a framework for global consistency for the rest of the map. Each set of logs created during map building will be geometrically connected to the scaffold in many places.

The scaffold is intended to keep the map coordinate frame consistent over time and accurate in shape. Having an easily accessible network of highly accurate, globally consistent locations enables reduction of localization drift during map data-collection. The global consistency may be extended to anything that may be localized relative to the network of globally consistent maps.

Consistency may be tested by building a scaffold and making a copy of an existing map. A set of logs (possibly those used to update the map) is localized to both maps. Their trajectories should be the same in both maps. When each log is in the previously mapped area, its trajectory should match to within a very tight tolerance. When it does not, the tolerance should be loose and should be a function of the driving distance between the closest in-map point and the tested point. Trajectory comparison may be not only on pose but on derived quantities like derivatives of pose. A log is then localized in which the same locations are visited over and over to a map with a scaffold. That localization output is checked to determine whether it is the same for all times at which the log is in the same place, both when the log is in the mapped area and when it is not (with a looser threshold when it is not). This may require human annotation of when the log is in the same place. Closeness may be measured by running point cloud matching. On the other hand, shape accuracy is tested by building a scaffold and annotating, either with absolute accuracy constraints or manually, the actual (latitude/longitude or 3-D Euclidean) distance between some pairs of vehicle poses in the scaffold domain. The observed shape is checked against expected distances. Pairs of points are selected at varying distances to model error as a function of distance with versus without the scaffold. It is noted that the annotation cannot occur until the scaffold is built since the labels are associated with particular poses in the scaffold.

In the sample embodiments, a scaffold of a geographic region to be mapped during an initial map build is created and environment geometry data generated during subsequent map builds is aligned to the scaffold to generate a map of the geographic region. As explained below, a scaffold is an initial map used in the mapping process to guide the vehicle in map build data collection. The scaffold is constructed from trajectory data to minimize the impact of loop closures in the entire map as map data is added to the scaffold in subsequent map builds. In sample embodiments, the map of the geographic region may be further anchored to globally accurate survey control points. The map of the geographic region may be used to navigate an autonomous or semi-autonomous vehicle through the geographic region.

In other sample embodiments, the first trajectory data comprises a first sequence of poses over the first period of time for the first vehicle and the second trajectory data comprises a second sequence of poses over the second period of time for the second vehicle. The first trajectory data and the second trajectory data may comprise measurements of vehicle position, orientation, force, or motion taken from at least one of an inertial measurement unit, a wheel speed encoder, and a GPS unit. These measurements may also be augmented by inter-log point cloud alignments, visual odometry, and the like. On the other hand, the first environment geometry data and the second environment geometry data are taken from one or more LIDAR units, radar units, sonar units, and/or cameras. In the sample embodiments, the sets of sensor measurements include LIDAR beam intensity values for the geographic region, and the first trajectory data and the second trajectory data are transformed into the common coordinate frame based on an alignment of the LIDAR beam intensity values. Environment geometry data from further sets of sensor measurements may be further aligned to transform further trajectory data into the common coordinate frame in a non-rigid manner.

In sample embodiments, a globally consistent georeferenced trajectory system for autonomous or semi-autonomous vehicles is provided that includes a memory to store instructions and one or more processors using the instructions stored in the memory to perform operations including: creating a scaffold of a geographic region to be mapped during an initial map build; receiving sensor data generated by vehicle sensors of at least one vehicle; identifying, from the received sensor data, a set of sensor measurements for a geographic region taken by the at least one vehicle, the set of sensor measurements including environment geometry data for the geographic region and trajectory data for the at least one vehicle; aligning the environment geometry data with the scaffold; generating a map of the geographic region including the environment geometry data and the scaffold; and navigating a vehicle using the generated map.

In the sample embodiments, the memory may store further instructions to perform operations including aligning environment geometry data generated during subsequent map builds to the scaffold to generate a map of the geographic region and anchoring the map of the geographic region to globally accurate survey control points.

In the sample embodiments, creating the scaffold of the geographic region to be mapped during the initial map build may comprise receiving a set of road segments included in a domain of the scaffold and a set of road segments in a map frame domain the scaffold is to support mapping on, and building the scaffold using the set of road segments included in the scaffold domain and the set of road segments in the map frame domain the scaffold is to support mapping on. Creating the scaffold of the geographic region to be mapped during the initial map build may further comprise mapping the set of road segments in the map frame domain the scaffold is intended to support mapping on by creating a latitude/longitude polygon enclosing an entire area expected to ever be mapped for the geographic region. The map frame domain may be the largest connected component of road segments inside the map frame domain, where connectedness is defined using only road segments entirely enclosed by the map frame domain. Creating the scaffold of the geographic region to be mapped during the initial map build may further comprise running coverage planning and scaffolding algorithms on coverage maps having data that is mappable to equivalent data in the generated map to be provided to the vehicle and generating route plans using a list of required, optional, and forbidden lanes to determine a route that visits each required lane in the list of required, optional, and forbidden lanes at least once and does not revisit a forbidden lane. Absolute accuracy constraints may also be provided for the scaffold.

In other sample embodiments, creating the scaffold of the geographic region to be mapped during the initial map build may further comprise placing logs collected for scaffolding in a log set and selecting from the log set a set of logs for each map build and performing log trajectory estimation and performing a map build using the selected set of logs.

In further sample embodiments, creating the scaffold may comprise creating at least two local scaffolds within the geographic region to be mapped during the initial map build, wherein the local scaffolds are separated by a threshold distance. On the other hand, creating the scaffold may comprise creating a first scaffold within the geographic region to be mapped during the initial map build and merging a second scaffold within the geographic region with the first scaffold to form a larger scaffold that connects together the first and second scaffolds when the first and second scaffolds are separated by less than a threshold distance.

In still further sample embodiments, creating the scaffold may comprise receiving as a seed scaffold at least one lane within the geographic region to be mapped during the initial map build; determining a furthest point from the seed scaffold within a road graph of the geographic region; finding a shortest route from the seed scaffold to the furthest point as part of the scaffold; determining whether all points in the road graph of the geographic region are within a maximum distance $d_{max}$ from the scaffold; and when all points in the road graph of the geographic region are within $d_{max}$ from the scaffold, completing the scaffold; otherwise, repeating determining the furthest point, finding the shortest route, and determining whether all points in the road graph are within $d_{max}$ from the scaffold, where $d_{max}$ is a distance in the road graph of the geographic region that has a highest cost to reach in a cost function used to generate the shortest route. Optionally, creating the scaffold may further comprise generating a return route back to the seed scaffold from the furthest point as part of the scaffold, wherein the return route does not overlap with the shortest route from the seed scaffold to the furthest point.

In other sample embodiments, a route planner is provided. In such embodiments, generating a map of the geographic region including the environment geometry data and the scaffold may further include providing routable lanes from the road graph of the geographic region to the route planner along with cost information to generate a coverage plan through all the required lanes for the road graph. The route planner generates a set of routes that visits all lanes of the scaffold at least once in a manner that is optimized to minimize a total amount of driving required. For example, each route generated by the route planner may be a loop. As appropriate, the scaffold may be split into routes that take a predetermined amount of time to run and that overlap every designated number of meters along a route.

In still other sample embodiments, overlap of routes may be checked by identifying non-covered lanes that are at distances from overlap regions of routes that are greater than a predetermined maximum distance from the overlap regions of the routes. The route planner may rerun a route plan with the non-covered lanes as required lanes and previously routed lanes as routable lanes and append new routes generated for the non-covered lanes to the previously routed lanes In yet other sample embodiments, the memory may store further instructions to perform operations including updating the generated map. Updating the generated map may include ensuring that no part of the selected logs that extends outside of a boundary of the scaffold will be incorporated into a new part of the generated map, limiting updating parts of the generated map that are part of the scaffold, and ensuring that each log intersects with the scaffold according to requirements including at least one of a number of overlap segments, a distance of overlap, and a maximum distance in a log from the scaffold.

Definitions

Numerous examples are referenced herein in context of autonomous vehicles. The term "autonomous vehicle" refers to a vehicle that is operated in a state of automation with respect to at least steering and propulsion. Different levels of autonomy may exist with respect to autonomous vehicles. For example, some vehicles may enable automation in limited scenarios, such as on highways, provided that a safety driver is present in the vehicle. More advanced autonomous vehicles may drive without any human assistance from within or external to the vehicle.

The term "spline" is used to refer to a wide class of functions that are used in applications requiring data interpolation and/or smoothing. The data may be either one-dimensional or multi-dimensional. Spline functions for interpolation are normally determined as the minimizers of suitable measures of roughness (for example integral squared curvature) subject to the interpolation constraints. Smoothing splines may be viewed as generalizations of interpolation splines where the functions are determined to minimize a weighted combination of the average squared approximation error over observed data and the roughness measure. For a number of meaningful definitions of the roughness measure, the spline functions are found to be finite dimensional in nature, which is the primary reason for their utility in computations and representation. It will be appreciated that such functions may also incorporate regression and other curve fitting or smoothing methods. Accordingly, such functions may be used interchangeably with the spline functions described herein.

A "geographic region" may refer to any physical area accessible by vehicle and its surrounding environment, including road segments, combinations of road segments, neighborhoods, cities, etc.

As used herein, a "scaffold" includes several elements that are stored in a production map for testability at any later time and for use in map building. The elements include:

Map frame domain: The set of road segments the scaffold is intended to support mapping on. For scaffold purposes, geometry, direction, connectivity and some road/lane usage information are needed. Mapping any road segments outside this set at any time may be a violation of scaffold requirements. However, it will be possible to extend the map frame domain.

Scaffold domain: A list of road segments included in the scaffold. For visualization purposes, it is desired that whatever data source the road segment IDs refer to are programmatically accessible.

Route plan domain: A list of road segments to be included in scaffold data collection in order to make the scaffold acceptable. This will be a superset of the scaffold domain.

Route Instances: A list of routes to be run in the scaffold data collection. For example, the same route may be driven three times, producing three instances but one route.

Scaffold Logs: A list of logs used in the initial scaffold map build run. A flag may be provided on each chunk of data in each cell saying whether it belongs to the scaffold in order to avoid replacing these chunks of data when updating the map.

One or more aspects described herein provide that methods, techniques and actions performed by a computing device are performed programmatically or as a computer-implemented method. Programmatically means through the use of code or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component may exist on a hardware component independently of other modules or components. Alternatively, a module or component may be a shared element or process of other modules, programs, or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects may be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid-state memory (such as carried on many cell phones and consumer electronic devices), and magnetic memory. Computers, terminals, network-enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog or VHDL. These languages contain instructions that ultimately define the layout of the circuit. However, once the circuit is fabricated, there are no instructions, and the processing is performed by interconnected gates.

Sample Embodiments

FIG. 1 is a block diagram illustrating autonomous vehicles in communication with an autonomous vehicle management system. In the sample embodiment of FIG. 1, an autonomous vehicle (AV) control system 120 may operate an autonomous vehicle through a geographic region for a variety of purposes, including transport services (e.g., on-demand transport, freight and delivery services, etc.). In examples described, autonomous vehicles may operate without human control, and instead, the AV control system 120 may autonomously steer, accelerate, shift, brake, and operate lighting components of the vehicle.

An autonomous vehicle management system 130 may manage a fleet of AVs at different levels of autonomy. For example, some of the AVs may be safety driver autonomous vehicles (SDAV) 101, where a safety driver sits in the driver seat. An SDAV 101 may switch between an autonomous mode, in which the vehicle control system 120 autonomously operates the vehicle, and a manual mode in which the safety driver takes over manual control of the vehicle. Other AVs in the fleet may be fully autonomous vehicles (FAV) 102 with no manual mode or safety driver.

Each AV may be equipped with multiple types of sensors 110 which may combine to provide a computerized perception, or sensor view, of the space and the physical environment surrounding the AV. Likewise, the control system 120 may operate within the AVs to receive sensor data from the AV sensors 110 and control the various vehicle functions in order to autonomously operate the vehicle. For example, the control system 120 may analyze the sensor data to generate low level commands executable by acceleration, steering, and braking systems of the AV. Execution of the commands by the control mechanisms may result in throttle inputs, braking inputs, and steering inputs that collectively cause the AV to operate along sequential road segments according to a route plan.

The AV sensors 110 operate to obtain a live sensor view for the vehicle control system 120 (e.g., in a forward operational direction, or providing a 360-degree sensor view), and to further obtain situational information proximate to the AVs, including any potential hazards or obstacles. The sensors 110 may include both passive sensors and active sensors. The passive sensors may include any number of stereoscopic or monocular cameras, infrared or other proximity sensors, inertial measurement units (e.g., accelerometers, gyroscopes, and/or magnetometers), wheel speed encoders, etc. The active sensors may include sensors 110 that emit electromagnetic radiation to detect return signals (e.g., LIDAR or radar), and in some examples, may also include one or more ultrasonic sensors that emit ultrasonic sounds waves and detect return signals (e.g., return pressure pulses) to enable the control system 120 to perform ranging operations. In addition, the vehicle may further include one or more position sensors, such as a Global Navigation Satellite System (GNSS) unit (e.g., a GPS unit). Note that GPS may be used interchangeably with GNSS throughout this document.

In various examples, some of the AV sensors 110 may be arranged in a sensor suite or sensor array mounted to the exterior of the AV, such as on the front bumper and/or roof. In general, the AV sensors 110 collectively provide sensor data to a localization engine of the vehicle control system 120. The localization engine may also access data storage containing localization maps of the given region in which the AVs operates. The localization maps may comprise a series of road segment submaps or spatially indexed data that enable the localization engine to dynamically determine an estimated state of the AV.

In addition to using the AV sensor data to control the vehicle itself, an AV may timestamp and log the raw sensor data, store the logs in the vehicle's data storage, and upload the logs of the sensor data to the AV management system 130. Using the logs from the fleet of AVs in a geographic region, the AV management system 130 may create and update the localization maps for that region.

According to some examples, an AV may upload its logged sensor data to the AV management system 130 through an AV interface 140, either on a set schedule (e.g., once per hour), in response to a request for the logs, in response to an event, or continuously. The AV interface 140 enables the AV management system 130 to exchange data with the AVs over a network. For example, the AV interface 140 may use one or more network resources (e.g., a cellular transceiver, a WLAN transceiver, etc.) to exchange communications over one or more wireless networks. The AV interface 140 may include or implement an externally-facing application programming interface (API) to communicate data with the AVs. The externally-facing API may provide access to the AV management system 130 via secure channels over the network through any number of methods, including web-based forms, programmatic access via restful APIs, Simple Object Access Protocol (SOAP), remote procedure call (RPC), scripting access, etc. In some examples, the AV management system 130 stores the received AV sensor logs in an AV sensor log database 150.

In some aspects, a georeferenced trajectory system 160 implements a pipeline that takes the raw sensor data in the logs and aligns vehicle trajectories into a common coordinate frame so that the map creation system 170 may generate and update localization maps without fuzzy data or ambiguity. Multiple sets of log data for a single geographic region may be combined to generate more accurate localization maps and fill in gaps that may exist in a single log due to obstructions such as other vehicles (either parked or moving), pedestrians, the space underneath the vehicle, etc. However, even if two sets of log data include sensor measurements for the same region, the sensor measurements are not in alignment with each other.

Generating accurate geometric models for the localization maps relies on the reliability and alignment of the trajectories (i.e., sequence of poses) for each of the logs. Repeated visits to the same region minutes or days apart, whether by the same vehicle or different vehicles, need corresponding pose estimates that accurately co-register sensor data, such as LIDAR point clouds, in the same coordinate frame. Incorrect registration results in multiple ground layers, doubled or fuzzy walls, etc., any of which may challenge or thwart the map creation system 170.

In one implementation, the AV management system 130 may provide a user interface for a user to select a geographic region (e.g., by drawing a polygon on a map, specifying latitude/longitude coordinates, etc.). The georeferenced trajectory system 160 may retrieve the sensor logs that contain sensor data for the selected geographic region and execute the georeferenced trajectory optimization pipeline on the retrieved sensor logs. In addition, the user interface may provide further filtering tools for the logs, such as a filter for type of vehicle that generated the sensor data, a date range for the logs, etc. In other implementations, the AV management system 130, or an external system that interfaces with the AV management system 130, may execute scripts or other automated processes to run the georeferenced trajectory optimization pipeline on programmed regions on a schedule. The AV management system 130 may also generate a report or log to display to users which indicates success or failure of the georeferenced trajectory optimization or map creation process, among other information.

Using the raw sensor data from the sensor logs that correspond to the selected geographic region, the georeferenced trajectory system 160 uses a multi-stage georeferenced trajectory optimization pipeline to align the vehicle trajectories into a common coordinate frame by, for example, fitting the splines to observations and smoothing. In some aspects, the pipeline includes GPS spline estimation, cross-registration target selection, reference map extraction, LIDAR alignment, pose graph optimization, and trajectory optimization, where the GPS spline is estimated based on raw sensor data from GPS, inertial, and encoder data in sample embodiments.

In one example, the georeferenced trajectory optimization pipeline results in amendments to each of the AV sensor logs that contain data for the selected region. Specifically, the georeferenced trajectory system 160 overwrites an existing trajectory channel of each log with updated trajectories in the common coordinate frame that are generated from the georeferenced trajectory optimization pipeline. The amended logs may then be stored in the AV sensor log database 150 for subsequent use by the map creation system 170.

The map creation system 170 constructs new localization maps for unmapped geographic regions using the AV sensor logs stored in the AV sensor log database 150, including the logs with updated trajectories generated by the georeferenced trajectory system 160. Once constructed, the AV management system 130 may transmit the localization maps to vehicles in the AV fleet through the AV interface 140, either as push updates or in response to requests from the vehicles for maps.

In various examples, the AV control system 120 may locally store and access the localization maps to perform dynamic comparisons with the live sensor view and to perform object detection and classification operations. As the control system 120 autonomously operates the vehicle along a given route, the AV control system 120 may access sequential localization maps of current road segments to compare the details of a current localization map with the sensor data in order to detect and classify any objects of interest, such as road debris, other vehicles, pedestrians, bicyclists, and the like. In accordance with many examples, the AV control system 120 may provide object of interest data to a prediction engine, where the objects of interest may each be classified (e.g., a pedestrian, a bicyclist, unknown objects, other vehicles, a static object, etc.).

Figure 2:
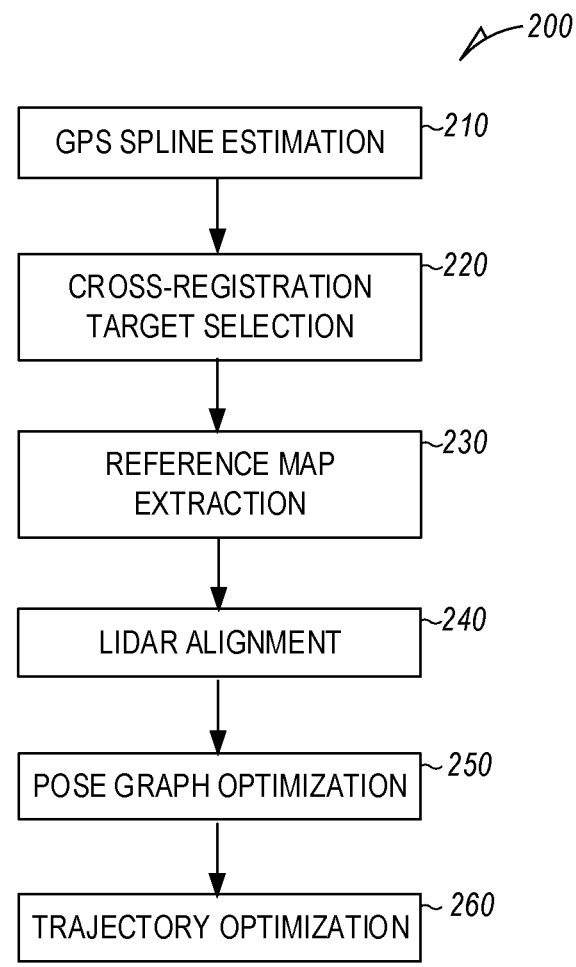
FIG. 2 is a flow chart describing a georeferenced offline trajectory optimization pipeline, according to examples described herein.

FIG. 2 is a flow chart describing a georeferenced offline trajectory optimization pipeline, according to examples described herein. While operations of the pipeline are described below as being performed by specific components, modules or systems of the AV management system 130, it will be appreciated that these operations need not necessarily be performed by the specific components identified and could be performed by a variety of components and modules, potentially distributed over a number of machines. Accordingly, references may be made to elements of the AV management system 130 for the purpose of illustrating suitable components or elements for performing a step or sub-step being described. Alternatively, at least certain ones of the variety of components and modules described in the AV management system 130 may be arranged within a single hardware, software, or firmware component. It will also be appreciated that some of the steps of this method may be performed in parallel or in a different order than illustrated.

According to some aspects, a georeferenced offline trajectory optimization pipeline implements processes that include GPS spline estimation (210), cross-registration target selection (220), reference map extraction (230), LIDAR alignment (240), pose graph optimization (250), and trajectory optimization (260). The georeferenced offline trajectory optimization pipeline uses data from logs generated by vehicle sensors from a fleet of vehicles and identifies sets of sensor measurements for a geographic region taken at different times. The sets of sensor measurements include environment geometry data and trajectory data in local coordinate frames. The georeferenced offline trajectory optimization pipeline aligns the environment geometry data between sets of sensor measurements, and, based on the alignment of the environment geometry data, non-rigidly transforms (e.g., bends/warps) the identified corresponding trajectory data into a common coordinate frame. The georeferenced offline trajectory optimization pipeline may then amend the sensor logs with the updated trajectories, which a map building process may use to generate accurate localization maps for autonomous vehicle operation.

In GPS spline estimation, for each vehicle sensor log, trajectory data from the vehicle's inertial measurement units (IMU), wheel speed encoders, and GPS unit are combined and analyzed to yield a spline trajectory, which is a sequence of positions and orientations of the vehicle that represents the path the vehicle drove through a geographic region (210). The position and orientation of the vehicle at a given time is referred to as the vehicle's pose, and a sequence of poses is referred to as the vehicle's trajectory. In addition, the splines may include velocities (linear and rotational) and accelerations (linear and rotational).

A cross-registration target selection process attempts to find locations where it appears there are multiple splines within threshold physical distances to each other (220). These candidate locations, also known as loop closure opportunities, alignment targets, or registration target events, are where multiple vehicles likely drove or where the same vehicle likely drove more than once. In some aspects, cross-registration target selection also differentiates candidate locations by vehicle heading direction. Passes where vehicles are traveling in the same general direction may be grouped together and considered separately from passes in other directions. For example, if the data show a vehicle traveling north in some cases and south through the same area in a few cases, target selection may select one loop closure opportunity among the north-bound set and another loop closure opportunity among the south-bound set, even if those two locations are positionally close to one another.

A reference map extraction process extracts a small reference map for each of the registration target events (230). In some examples, the process extracts, from the vehicle logs, LIDAR data around the time of the registration target event (e.g., a few seconds before and after the event).

In some aspects, LIDAR alignment attempts to find a transformation between each LIDAR keyframe and its corresponding reference map using LIDAR geometry data (240). This transformation may be represented as a pose and its uncertainty.

The pose graph optimization process reduces errors in the final log trajectories by pulling trajectories together wherever matches are found using the nodes and edges in the pose graph (250). The matches are data for physical locations that the pose graph optimization process determines are the same approximate place at different times. The process determines a spatial relationship between the nodes and gives a correction for each node in the graph.

The trajectory optimization process smooths trajectories in each log by combining logged trajectory measurement data from IMUs and wheel speed encoders with the corrected nose poses (260). Trajectory optimization attempts to generate spline representations that satisfy each of these measurements and minimize error between them. For example, if the pose graph places two adjacent samples at a distance that conflicts with the IMU data, the trajectory optimization process combines the two by attempting to minimize the error in an optimization step. For each log, the trajectory optimization process outputs a new trajectory that is aligned to the other logs in a common reference frame, which may be used to build a map without fuzzy data or ambiguity.

Figure 3A:
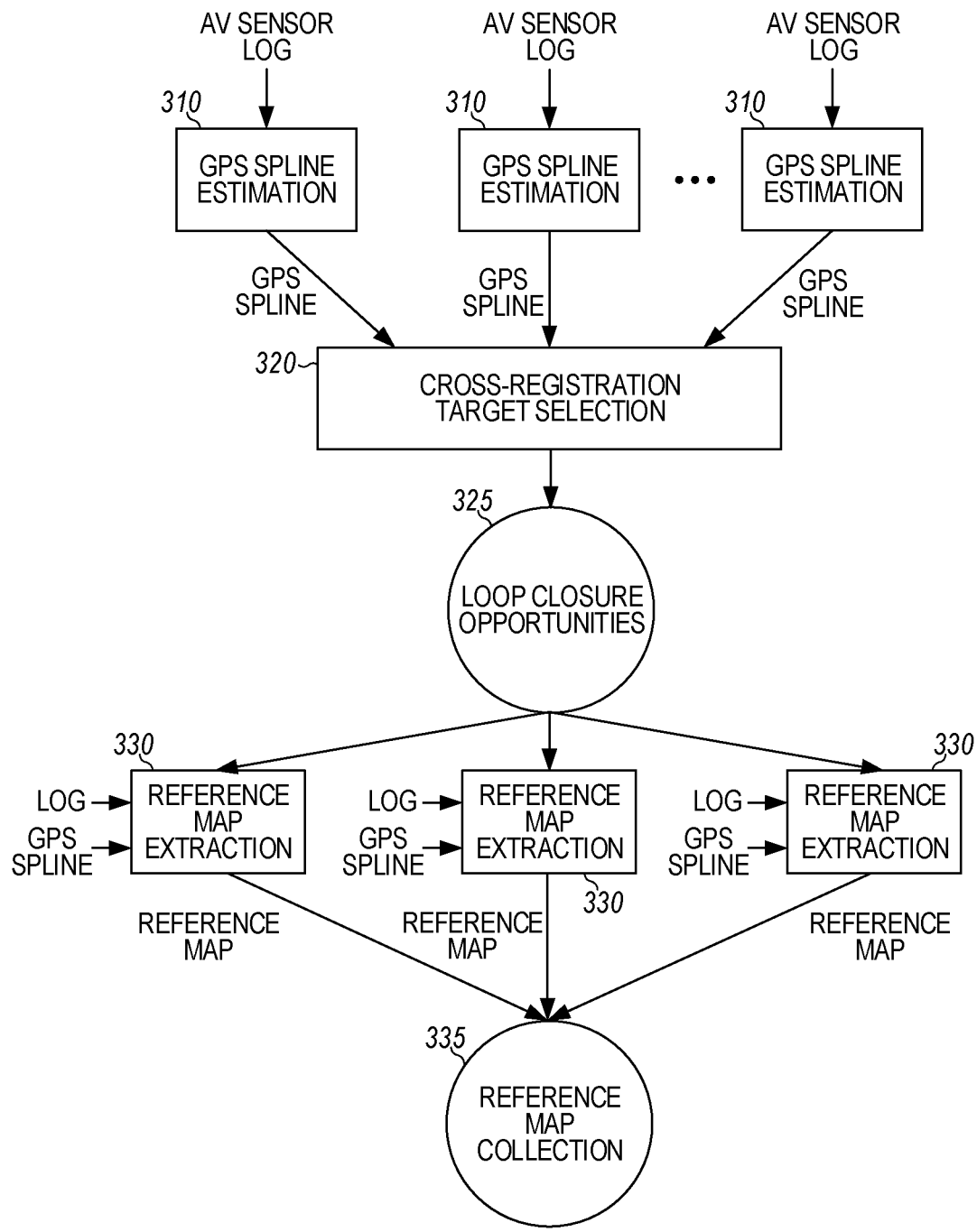
FIG. 3A is a block diagram illustrating example operations and data in a georeferenced offline trajectory optimization pipeline, according to examples described herein.

FIG. 3A is a block diagram illustrating example operations and data in a georeferenced offline trajectory optimization pipeline, according to examples described herein. For each sensor log independently, trajectory data from the vehicle's sensor log are combined in a three-phase trajectory optimization to yield a locally-coherent trajectory with bounded, but potentially large, errors (up to tens of meters). In some examples, the trajectory data includes samples from inertial measurement units (IMU), wheel speed encoders, and a GPS unit. The output of the GPS spline estimation 310 process for each sensor log is a GPS spline. In some examples, the GPS spline is a spline trajectory represented in an appropriate Universal Transverse Mercator (UTM) frame. In other examples, GPS trajectories are given using coordinates in other map projections.

The first phase of GPS spline estimation 310 takes the sensor data and produces a crude but reasonable starting point for subsequent refinement. In some aspects, GPS spline estimation 310 constructs roughly five-minute subsegments of the trajectory, using samples from the IMU and wheel speed encoders, and registers each subsegment to its corresponding GPS samples. This estimated transformation (from the local to common frame) may warp significantly over the duration of the log, and significant numbers of GPS samples may be discarded as outliers in each subsegment fit. By blending together the sequence of transformed subsegments into one contiguous trajectory, GPS spline estimation 310 reliably achieves a starting trajectory within the basin of attraction of one or more programmed thresholds or constraints.

The second phase of GPS spline estimation 310 takes the assembled initial trajectory from the first phase and constructs a spline modeling dynamic GPS bias, odometry scale, and IMU gyro and IMU acceleration bias. The spline and calibration parameters are jointly regressed against sensor measurements and a simple motion model.

The third phase of GPS spline estimation 310 takes the refined trajectory from the second phase as initialization, along with IMU, wheel speed encoder, and bias-corrected GPS samples, and optimizes a richer spline trajectory representation and calibration parameters against the measurements and motion model jointly. For each log, this produces a spline trajectory in a common coordinate frame representing the full six degrees of freedom (6 DoF) for pose, velocity, and acceleration of the vehicle as a function of time.

A cross-registration target selection 320 process jointly analyzes the collection of GPS splines to identify distinct regions that are visited multiple times within and across different logs. Such regions are favorable targets for cross-registration of sensor data captured at different times. These targets may be referred to as loop closure opportunities (LCO) 325, even though some targets may not correspond to physical loops in a trajectory. Intersections and other join points are characteristic LCOs, but cross-registration target selection 320 also selects moments from vehicle travel along straight roads traversed multiple times in the logs. Along with the identified targets (specified by a timestamp in one of the sensor logs), cross-registration target selection 320 also enumerates, for each LCO 325, a set of query intervals: {log, [start_time, end_time]} tuples during which sensor data might be usefully registered to the LCO 325. In some examples, the density of LCOs 325 is limited using a non-maximum suppression scheme that considers the most popular LCOs 325 first, adding more to the chosen set until a target density is reached.

For each LCO 325 independently, a reference map extraction 330 process extracts a small reference map by co-registering LIDAR data from the interval around the LCO time in the source sensor log. In some examples, the interval is a few seconds before and after the LCO time. Longer intervals produce larger reference maps with more error, whereas shorter intervals produce small reference maps that are less likely to find interesting matches. The LIDAR points are then co-registered using the pose estimates from the log's GPS spline estimation. While the GPS spline pose estimates may have substantial absolute error in the global frame, the local motion is accurate. In addition, an Iterative Closest Point (ICP) registration step is performed to refine the estimate so the resulting geometry in each reference map is coherent.

In some aspects, reference map extraction 330 also attempts to identify and remove dynamic objects, such as moving vehicles, pedestrians, etc., from the reference map collection 335. In other aspects, no attempt is made to remove the dynamic objects during reference map generation. As a result, the reference maps may include fuzzy tubes of LIDAR points from moving vehicles and other dynamic scene elements. However, reference maps dominated by such movers are unlikely to yield useful alignments.

Figure 3B:
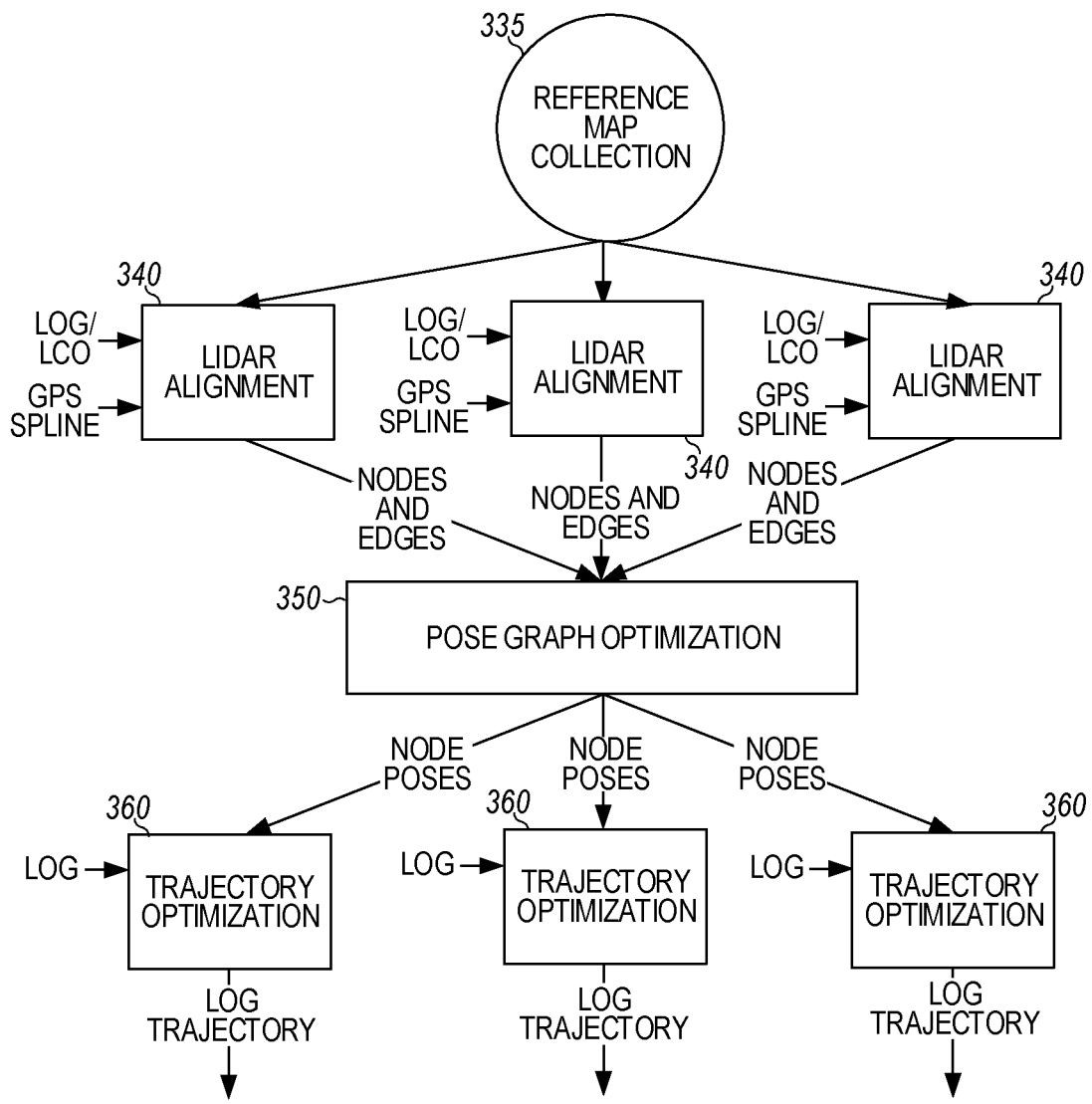
FIG. 3B is a block diagram illustrating further operations and data in a georeferenced offline trajectory optimization pipeline, according to examples described herein.

FIG. 3B is a block diagram illustrating further operations and data in a georeferenced offline trajectory optimization pipeline, according to examples described herein. In some implementations, for each sensor log independently, the GPS spline for that log is traversed to extract environment geometry data. In other implementations, the GPS splines are traversed to extract environment geometry data for each LCO 325 independently.

In some aspects, the environment geometry data are periodic LIDAR keyframes. Each keyframe is a set of co-registered LIDAR points in a local coordinate frame, comprising one or more LIDAR sweeps. In a LIDAR alignment 340 process, these keyframes may be aligned to each other over short time periods and aligned to reference maps produced by the previous step during the corresponding query intervals. Although the process of aligning environment geometry data is described using LIDAR alignment 340, alignment could additionally or alternatively be performed using other data that capture environment geometry/structure/texture, such as sonar, radar, or image data. Thus, as used herein, environmental geometry data is data that describes the position, shape, orientation, and/or other spatial features of objects in the vehicle's environment. Such objects may include roadway surfaces, buildings, geological features, road signs, buildings, other vehicles, and the like. Environmental geometry data may be captured using sensors or sensor systems such as LIDAR, RADAR, SONAR, cameras, etc.

The LIDAR alignment 340 process is achieved by minimizing distances between points and the surface. The result is a maximum-likelihood estimate of the 6 DoF rigid transformation (and its uncertainty) between the two coordinate frames.

Unlike steady-state LIDAR alignment on the vehicle, the initial guess for loop closure attempts may be far from accurate. In one aspect, to accommodate this highly uncertain initialization, LIDAR alignment 340 may employ a brute force search over positional perturbations around the relative pose implied by the GPS trajectories to find a good alignment. This perturbed search resembles the process used for LIDAR-based bootstrapping on the vehicle. In another aspect, LIDAR alignment 340 may directly attempt to coarsely register the data, such as by extracting feature descriptors from the LIDAR or camera data and applying a coarse registration technique.

Each successful alignment between neighboring LIDAR keyframes extracted from the log yields an incremental alignment estimate, while each alignment from an extracted LIDAR keyframe to a previously extracted reference map yields a loop closure. Also, incremental estimates may be provided both by alignments and relative poses. Both incremental alignment estimates and loop closures are edges in the resulting pose graph, with the incremental edges being along a same trajectory (e.g., one vehicle driving down a road), and the loop closure edges tying together one trajectory to another (e.g., two vehicles drove down the same road at different times) or two segments of the same trajectory (e.g., one vehicle drove down the same road at different times). In some examples, for faster execution, LIDAR alignment 340 may skip performing incremental alignment between consecutive LIDAR keyframes, instead synthesizing incremental edges using the relative motion encoded in the GPS spline.

In further aspects, LIDAR alignment 340 may incorporate LIDAR beam intensity values into the alignment process. When alignment is based solely on geometry, uniform and plain areas like tunnels and flat fields may be difficult to distinguish. LIDAR beam intensity values that represent the reflectivity of the surface that the LIDAR beam hits may therefore be used to identify bright areas like road lines, tiled walls, colors, etc., enabling LIDAR alignment 340 to more accurately align logs or LCOs.

The collection of incremental alignments and loop closures from the LIDAR alignment 340, in combination with the reference maps, form one large pose graph. The sampled poses and reference maps are the graph's nodes, and the incremental alignment estimates and loop closures form the graph's edges, each an observation of the relative pose between the coordinate frames of its endpoints. The pose graph optimization 350 process determines the layout of the nodes that best satisfies the edges.

Depending on the number of logs and resolution of LIDAR keyframes, this pose graph may be very large. For example, a dataset of 72 logs from northeast San Francisco yields a pose graph with 1.0M nodes and 2.4M edges. The graph itself is very sparse, as most nodes are connected only to their predecessors and successors in a chain. The loop closure edges encode the critical constraints that provide an accurate within-log and across-log layout of the resulting graph.

In some aspects, pose graph optimization 350 employs an iterative nonlinear optimization approach. The objective function is iteratively linearized, and the sparse linear system at each iteration is approximately solved using preconditioned conjugate gradients. Next, the node poses are updated in the manifold of rigid transformations according to the solution to the linear system. A schedule of robust cost functions for the edges allows the pose graph optimization to converge reliably even when far from the optimum, while fully ignoring outlier edges from spurious or imperfect LIDAR registration.

To improve efficiency of the pose graph optimization 350, the process optionally may employ a coarse-to-fine initialization for improved convergence rates and lower overall runtime. The initial graph is recursively coarsened into progressively smaller graphs by agglomerating neighboring nodes into clusters. Then, starting from the coarsest graph, each level is optimized, and its result is translated up to the next finer level, ultimately yielding an improved initialization for the full resolution graph. The full input graph is then optimized from that starting point. In addition, using the conjugate gradients method for solving sparse systems of linear equations benefits from a good choice of preconditioner. Rather than a simple block-diagonal preconditioner, pose graph optimization 350 may use an incomplete LDLT preconditioner, which yields better conditioning for the long chains and sparse loop closures that characterize these pose graphs.

For each log independently, a trajectory optimization 360 process generates absolute pose estimates from the node pose (i.e., keyframe) layout produced by the pose graph optimization 350. The spline trajectory for the log is then optimized against the IMU, wheel speed encoders, and those synthetic pose estimates. This refinement respects the global layout determined from the pose graph, while still producing a locally smooth and coherent trajectory that satisfies the IMU and wheel speed encoder measurements.

In some aspects, each resulting trajectory is sampled to generate a vehicle pose amendment to its input log. The map creation system may then use these amendments in the localization map creation process.

Figure 4:
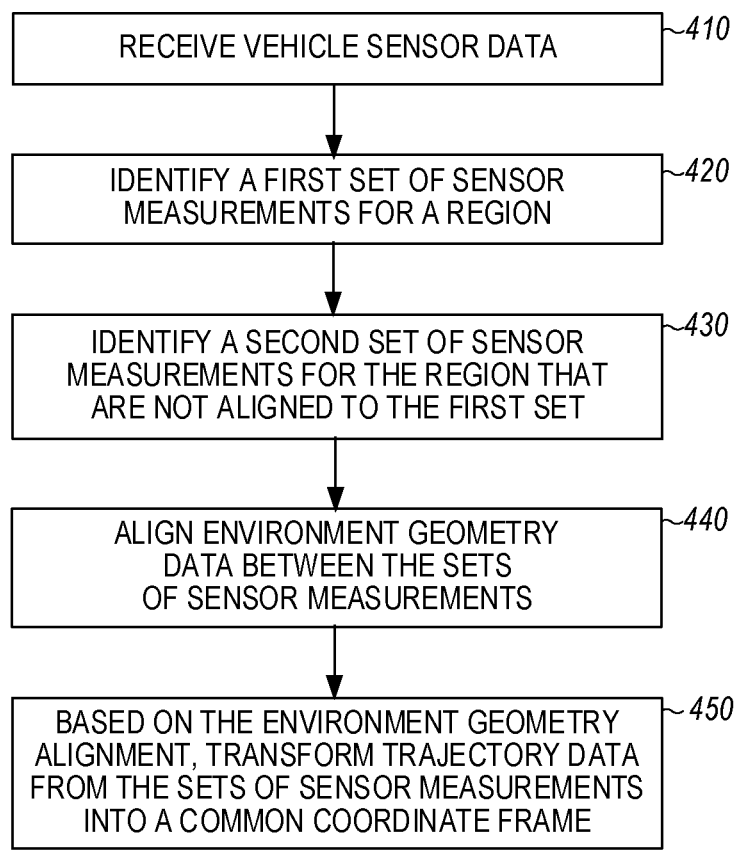
FIG. 4 is a flow chart describing a method of vehicle trajectory mapping, according to examples described herein.

FIG. 4 is a flow chart describing a method of autonomous or semi-autonomous vehicle trajectory mapping, according to examples described herein. Although described with respect to two vehicles, the method of vehicle trajectory mapping may be used to align trajectories in logs from any number of vehicles, including the case where a single vehicle traverses the same geographic region at different times.

With reference to an example of FIG. 4, a georeferenced trajectory system, such as described in FIG. 1, receives data generated by vehicle sensors from a fleet of vehicles (410). According to some aspects, the georeferenced trajectory system identifies, from the received data, a first set of sensor measurements for a geographic region taken by a first vehicle over a first period of time (420). The first set of sensor measurements includes environment geometry data for the geographic region and trajectory data for the first vehicle.

The georeferenced trajectory system identifies, from the received data, a second set of sensor measurements for the geographic region taken by a second vehicle over a second period of time (430). The second set of sensor measurements includes environment geometry data for the geographic region and trajectory data for the second vehicle that is out of alignment with the trajectory data for the first vehicle.

The georeferenced trajectory system aligns the environment geometry data logged from the first vehicle with the environment geometry data logged from the second vehicle (440). Based on the alignment of the environment geometry data, the georeferenced trajectory system transforms the trajectory data logged from both vehicles into a common coordinate frame (450).

The above-described structure of the georeferenced trajectory system generally assumes a local representation is sufficient for all use cases, including for the autonomous vehicle and offboard tasks. In a sample embodiment, the resulting map is represented as a connected graph of submaps, each of which carries its own coordinate frame, and relates to neighboring submaps through a rigid 6 degree-of-freedom (DoF) transformation. Each submap contains multiple layers, each providing a specific type of spatial information covering the submap's core region (typically on the order of 100 m diameter near the submap origin). Submaps are not required to have any absolute accuracy relative to a real-world location (i.e., the submap is placed in the world relative to absolute GPS coordinates), but it is typically assumed that the discrepancy is within 20-25 meters in the worst case. Once localized in a submap, the autonomous vehicle may theoretically maintain a high accuracy map-relative pose estimate considering only local coordinate frames.

While this map representation carries several advantages as an AV-dedicated map, it is sometimes suboptimal for other use cases, such as a simulation. The map representations described above enable local modifications to affect only a very localized neighborhood. For example, to update an area of the map to account for physical changes in the environment, only a small number of submaps are affected. However, error may accumulate when traversing multiple submaps, resulting in unclosed loops when laying out the submaps in the loop in a single coordinate frame. Also, it may be difficult or impossible to use for applications that expect to operate with a global state.

Globally Consistent Maps

The following description provides systems and methods for trajectory estimation from logs to support globally consistent maps that address the issues described above. This process occurs early in the map build process and outputs trajectories that are used downstream for generating prior layers. More specifically, given a set of logs and some survey control points or other fixed reference points, the problem being addressed is to incrementally and iteratively build maps in parts and to update over time using map build data from multiple map build sessions while maintaining consistency across map build sessions. To address these issues, the systems and methods described herein estimate the trajectories of the vehicle for each log that meet the following Trajectory Estimate Criteria:

Trajectory estimates represent the six degree-of-freedom vehicle pose at high frequency over the duration of the log.

The trajectory estimates are smooth and physically valid.

The trajectory estimates are globally consistent. Driving a closed loop results in zero net accumulated trajectory.

The trajectory estimates are self-consistent and cross-log consistent. Passing through the same area multiple times produces precisely aligned sensor readings.

If ground control from survey or other source of absolute accuracy are available, the trajectory estimates attempt to minimize error in absolute accuracy.

Trajectory estimates that traverse mapped and unmapped areas adhere to the properties above, i.e., introducing new sections to the map maintains consistency within the resulting combined trajectory set.

In addition to the criteria specified above, the systems and methods described below support the following objectives:

Producing the map is efficient and scalable.

The method supports updating or replacing small areas of the map (e.g., updated to account for construction, errors in the map, etc.).

The method generally supports concurrent builds of different parts of the map. However, concurrent builds are to be limited to areas that have zero overlap of new areas intending to be mapped.

The method is able to support map builds covering large distances, including across multiple Universal Transverse Mercator (UTM) boundaries.

The method supports updates to small, targeted sections of the map without needing to update the entire map.

Ideally, the accumulated error during the map build approximates zero.

It will be appreciated by those skilled in the art that global consistency does not imply absolute accuracy and vice versa. Fortunately, they are not mutually exclusive, and it is possible to achieve both (not necessarily for free). Some benefits of maximizing absolute accuracy include improved localization performance, assuming the initial guess is based on GPS. GPS samples are more likely to correspond to map coordinates (except in areas of systematic bias due to multipath effects, such as dense downtown cores). Also, both GPS and map-relative pose estimates may be included in the same state estimator (i.e., the same extended Kalman filter (EKF) may handle both types of measurements). In addition, global consistency permits consistency (or bounded consistency) with existing map systems and enables more straightforward integration with and visualization in third-party tools.

The system and method described below for providing globally consistent maps builds on the georeferenced trajectory system described above. As noted above, the georeferenced trajectory system takes in a set of logs as input and produces a trajectory for each log based on the raw sensor data (camera imagery, IMU, GPS, encoder, LIDAR) that may or may not be tied to an absolute reference frame. The resulting trajectories are consistent in that they meet the first three Trajectory Estimate Criteria noted above. While the results from a single map build session are consistent, there is currently no mechanism to maintain consistency across multiple map build sessions. The system and method described below introduces consistency across multiple map build sessions by varying the trajectory estimation approach depending on whether the area is already mapped. For areas that have already been mapped, trajectories are based on alignment to the map (either using priors as reference maps or running the localization system against the map). For areas not already mapped, georeferenced trajectory estimation based on raw sensor data as described above may be utilized. To combine the trajectory segments, the georeferenced trajectory segments are smoothly blended into the map-aligned trajectory segments without modifying the localized trajectory segments.

This process maintains an invariant that the map is globally consistent. Initially, the unpopulated map is trivially globally consistent. Subsequent map building sessions add sections to the map that do not break consistency since they do not modify the existing map, and new sections are blended in a way that preserves the global consistency invariant.

To ensure that the map building sessions are consistency-preserving, some process constraints are applied:

Concurrent mapping builds should not overlap. This constraint may be handled by planned map build features including a locking mechanism to prevent any intersection between intended build targets that are not already in the map and using a queue to verify that landing the changes in the map is permitted upon completion.

The map build sessions will be constrained to covering areas within the existing map if one is available. Coverage outside the existing map could result in a sequence of map build sessions completing a loop closure where the accumulated error introduces distortion or inconsistency in the trajectories.

The map build strategy follows a well-defined process. Guidelines on how to design a suitable scaffold (initial map), how to choose subsequent builds, and extension of scaffolds are specified prior to map builds.

The map build architecture for providing globally consistent maps now will be described with respect to FIG. 5.

Figure 5:
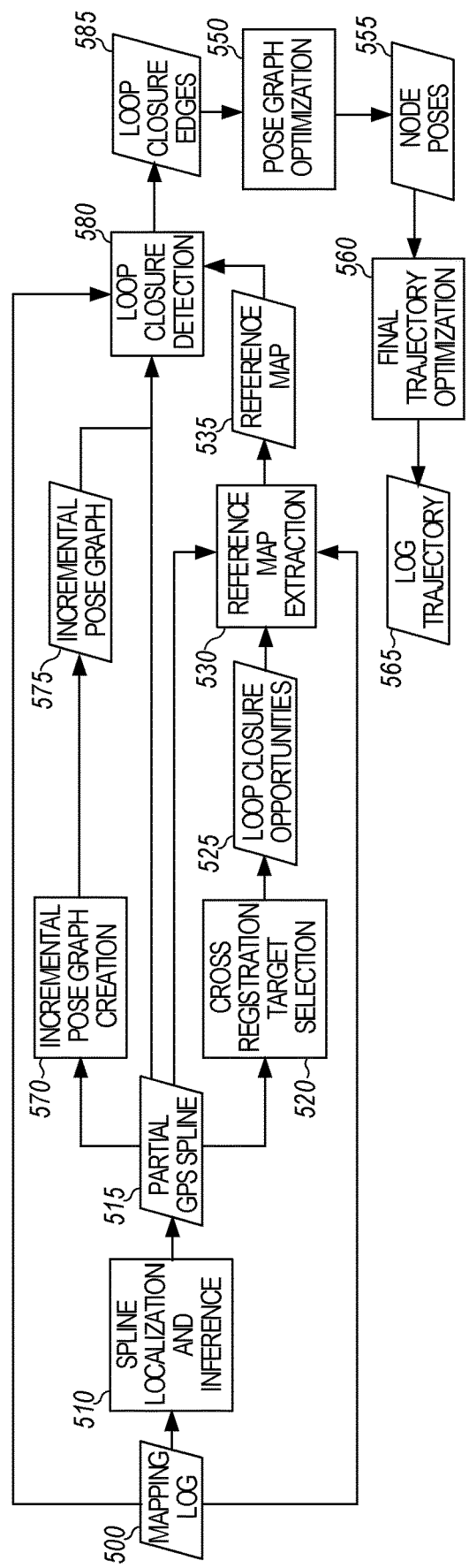
FIG. 5 illustrates the map build architecture for providing globally consistent maps in a sample embodiment.

As illustrated in FIG. 5, the map build architecture receives mapping log inputs 500 such as AV sensor log data (FIG. 3B) Each log used as an input has valid GPS, IMU, LIDAR, and encoder data. Some logs may have naturally occurring stationary periods due to traffic lights, stop signs, etc. that may be used for bias estimation. The set of input logs 500 also should have overlap in unmapped areas (a single log with multiple passes in an area is okay), and if a map is available it should overlap with the existing mapped area. Accurate absolute constraints may be provided but are not required. If absolute constraints will be used to map a city, then some should be present in the initial map build run for that city.

In sample embodiments, the mapping log inputs 500 further include submap data or spatially indexed data that may be used to provide estimates of where the vehicle is located by mapping from unmapped areas back to mapped areas to fill in the unmapped areas. Thus, the system illustrated in FIG. 5 may relate to stored maps when collecting build data and may populate the map being built relative to the known map data. In examples described herein, the known map data may be a scaffold that is used to guide the vehicle in map build data collection. Since known map data is used in the mapping process for mapping unmapped areas. Accordingly, steps are taken to avoid distortions in the created map as newly mapped sections are added to the existing map or map scaffold. The trajectory data from multiple map build data collection sessions is aligned to build up the map data over several map build sessions. An offline batch process may align the scaffold data with the existing maps of the mapped areas.

As illustrated in FIG. 5, splines are generated at 510 in parallel for each mapping log 500. The initial spline generation at 510 creates partial GPS splines 515 that are both constructed from GPS, IMU, and encoder data in areas where localization to a map is not available and uses available localization information when maps are available. The key differences in the initial spline estimation between steps 310 (FIG. 3A) and 510 are the ability to localize to an existing map where available, the generation of several partial GPS splines 515 per log instead of a single GPS spline per log, and trajectories generated by localizing to the map have additional information for estimating internal state such as IMU biases, etc. It is noted that in another embodiment a single GPS spline may be used that respects the fixed poses where the vehicle was aligned to the map.

The partial GPS splines 515 are applied to the cross-registration target selection 520 process to jointly analyze the collection of partial GPS splines 515 in parallel to identify the distinct regions that have been visited multiple times within and across the different mapping logs 500 to identify loop closure opportunities 525. As in the embodiment of FIG. 3A, the loop closure opportunities 525 are processed by reference map extraction 530 to identify and remove dynamic objects to product a reference map 535.

The reference map is generated once per loop closure opportunity to be used for registering trajectories in the same geographic region. The partial GPS splines 515 are also provided to incremental pose graph generation process 570 in parallel, once for each spline, and each spline is sampled at regular time intervals to compute transformations between samples to create an incremental pose graph 575. Nodes in the incremental pose graph 575 are aligned to the reference maps 535 when the reference maps 535 are available. The partial GPS splines 515, reference map 535, and incremental pose graph 575 are provided to loop closure opportunity detection process 580, which runs once for a set of generated splines to examine all splines to find geographic overlaps that could result in loop closures. The resulting loop closure edges 585 are provided to pose graph optimization process 550 to determine the layout of the nodes that best satisfies the loop closure edges 585. The resultant node poses 555 are provided to the final trajectory optimization process 560 to generate absolute pose estimates from the node pose 555 layout produced by the pose graph optimization process 550. The pose graph optimization process 505 is performed once in parallel for each statistically independent pose graph 575.

Statistically independent pose graphs 575 are made possible in this embodiment because of the way that spline trajectories are generated. Therefore, pose graph optimization may be run in parallel for statistically independent pose graphs where there are no connections between different parts of the pose graph. The spline trajectory for the log is optimized and in the final trajectory optimization process 560 in parallel, once per log at most. All independent spline information for all the splines from one log are accumulated, and the results are smoothed to ensure feasible dynamics. The resulting log trajectory 565 is output for use in the map build. In this embodiment, the final trajectory optimization process is modified to used fixed control points to transition splines to where they are supposed to be.

Figure 6:
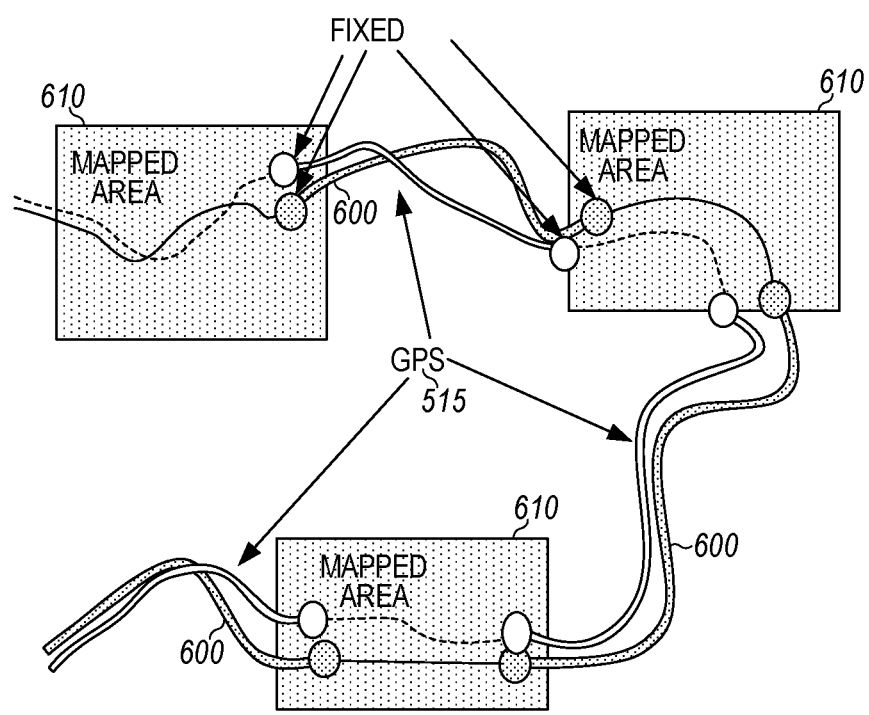
FIG. 6 illustrates partial GPS splines and fixed splines for transitioning the splines to fixed control points for connecting the respective mapped areas in accordance with the process of FIG. 5.

FIG. 6 illustrates partial GPS splines 515 and fixed splines 600 for transitioning the splines to fixed control points for connecting the respective mapped areas 610 in accordance with the process of FIG. 5. In FIG. 6, each group of illustrated splines represents a statistically independent pose graph. As illustrated, the goal is to provide a smooth transition when connecting mapped areas 610 together.

The success of the globally consistent log trajectory estimation is highly dependent on the data collection strategy. The proposed data collection strategy involves gathering data along a compact encompassing scaffold of a city or other geographic region that is fully-connected and includes major arterial hubs for the initial map creation. The initial scaffold and all future map builds should be constructed to minimize the impact of loop closures on the entire map in subsequent builds. Subsequent data collections may act to fill in the scaffold by collecting data along routes that include the scaffold (for localization) and the new areas to be mapped out. For example, it is desired to minimize the potential for future loop closures that could warp the entire map or warp new input trajectories.

Figure 7:
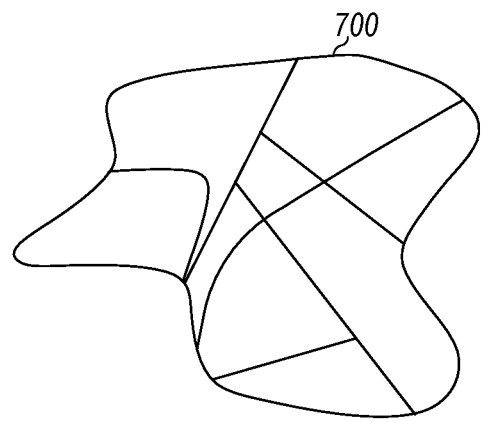
FIG. 7 illustrates an example initial scaffold for initial map creation.
Figure 8:
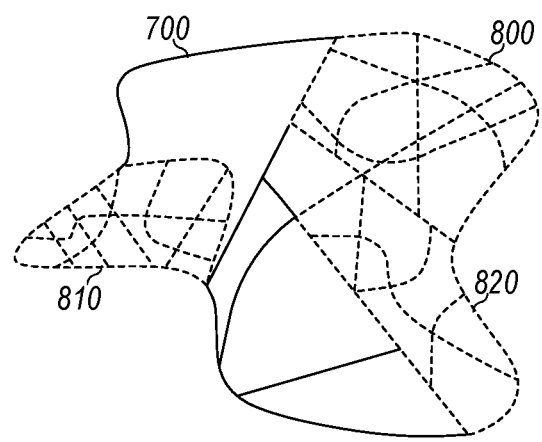
FIG. 8 illustrates the initial scaffold of FIG. 7 with subsequent routes overlaid thereover.

FIG. 7 illustrates an example initial scaffold 700 for initial map creation. It is noted that the initial scaffold is within a map frame boundary for a geographic area, and a subset of road segments inside the boundary is selected to be the map frame domain (i.e., encompassing all road segments that might ever be mapped). The initial scaffold is a subset of the map frame domain, preferably selected to basically ensure that everything in the map frame boundary is close to the scaffold. FIG. 8 illustrates the initial scaffold 700 with subsequent routes 800, 810, and 820 overlaid thereover. Routes 800, 810, and 820 represent sample routes to be taken when collecting the map data to fill in the scaffold 700. The routes 800, 810, and 820 and scaffold 700 are preferably selected to avoid routes that may lead to bad data collection.

FIG. 9A illustrates a non-compact scaffold 900 in which the two end points of the scaffold 900 may have larger relative error. In this example, the scaffold shape is estimated to be an "L" at 90 degrees when in reality it is closer to 85 degrees. If that L is used as the initial scaffold, then a path is added connecting the two extremes of the L in subsequent builds. In such a case, either the new trajectory will have to stretch significantly to fit the current map model of the world or the entire map will have to be rebuilt with new data so that no one trajectory is significantly warped.

FIG. 9B illustrates the addition of a non-loop extension 910 to the scaffold 900. The global position of the non-loop extension 910 is likely to have higher error on average than scaffold 900 because location drift (relative to 900) can accumulate all along the length of 910. The farther one gets along a trajectory from a point where another trajectory has been matched (e.g., the left end of scaffold 910), the less information that is available to constrain location.

FIG. 9C illustrates a scaffold expansion that results in a non-compact scaffold 920. Adding the two regions 930 reduces the compactness of the scaffold 920. In this case, adding the dashed road 940 would maintain compactness. If one wishes to collect the upper two roads (930), then more roads should be collected to maintain good properties, such as compactness, which would be defined as something similar to (area of all solid regions)/(perimeter of all solid regions). When road 940 is added to the collected region, the entire upper rectangle is added to the area. Generally, it is desirable to reduce the perimeter to increase compactness. It is noted that incrementally expanding the scaffolding 900 around the perimeter may lead to a discrepancy when the expansion around the entire perimeter is complete.

As illustrated in FIG. 9D and FIG. 9E, the last scaffold expansion 950 will be distorted by the accumulated area around the perimeter (since the previous expansions are now fixed). The solution is to update the expansion in a single, jointly optimized pass. The perimeter is expanded while leaving the existing mapped area fixed provided all the expanded area is covered at once. What is to be avoided is piecemeal expansion of the perimeter, where the last part would be more distorted.

Figure 10A:
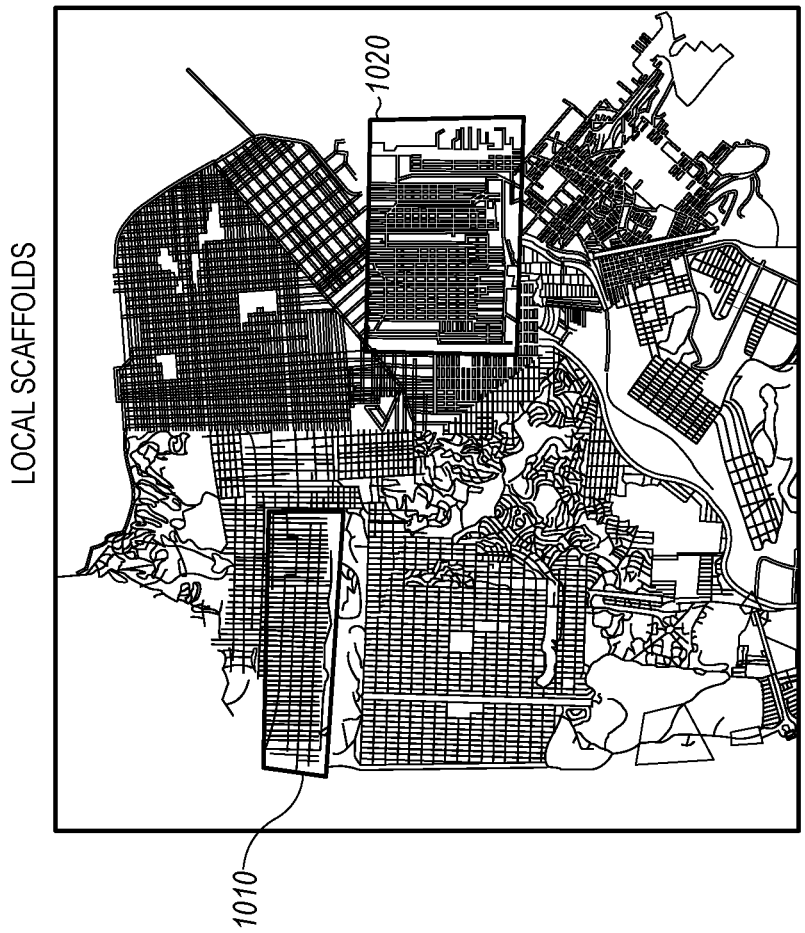
Figure 10B:
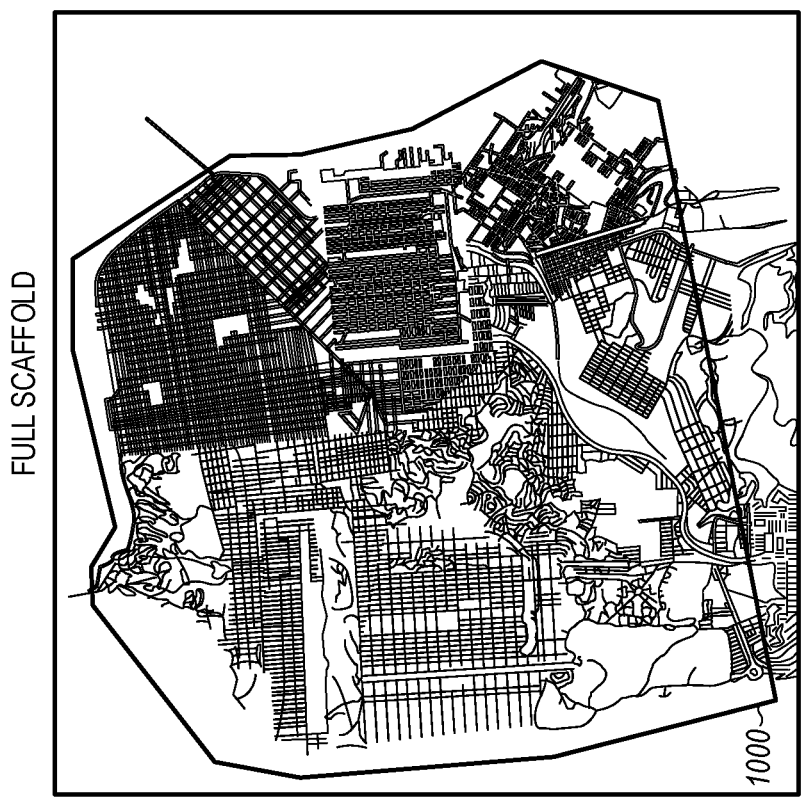
FIG. 10B illustrates sample local scaffolds.

FIG. 10 illustrates a potential scaffold plan for San Francisco, Calif. that satisfies the criteria set forth herein. FIG. 10A illustrates a full scaffold 1000, while FIG. 10B illustrates sample local scaffolds 1010 and 1020. In practice, a more closely spaced scaffold may be required. This scaffold plan 1000 is used to instruct the vehicles where to drive to collect map build data by routing the vehicle relative to the scaffold plan 1000. As noted above, the plan for collecting the map build data should take into account the process constraints noted above so that the resulting map build may be properly aligned with the scaffold plan 1000. As described below, additional constraints may be applied to the local scaffolds 1010 and 1020.

The size of scaffold datasets is commensurate with sizes of datasets used for map builds as in the embodiment described with respect to FIGS. 2-4 above. By way of example, rough estimates for Phoenix and San Francisco include:

Phoenix Geofence:
   Scaffold length: <75 km
   Historical data collect rate: 28 km/h
   →2.6 hours of data collect per pass Overall, <16 hours of data collection for the scaffold, assuming no more than 6 passes are required.

San Francisco Geofence:
Scaffold length: <100 km
Historical data collect rate: 15 km/h
→6.7 hours of data collection per pass
Overall <40 hours of data collection for the scaffold, again assuming no more than 6 passes.

In sample embodiments, the scaffold is built and maintained by defining the domain, making and executing coverage plans, and trying to build all scaffold logs in one log trajectory estimation run. As long as any scaffold logs do not make it through the log trajectory estimation, the domain is redefined, and a new coverage plan is created and executed. The rest of the map building is then performed with some scaffold-specific steps. The scaffolding algorithm processes all connectivity information (which lanes connect to which lanes) as well as lane information such as the length of each lane. To define the map domain via a polygon, the location of each lane within the world may also need to be provided. Later, the map may be added to or updated so as to preserve all scaffold data with some scaffold-specific logic.

The scaffold data properties in a sample embodiment are described below.

Common Definitions

Given a map markup dump for a region, define G as the graph whose vertices Vertices(G)=J are the set of all map markup junctions in the dump and whose edges Edges(G)=T are the set of all directed map markup segments in the dump. A map markup segment is a line segment approximating the shape and location on Earth of a section of road, and a map markup junction is a logical point on which one or more map markup segments are incident.

Define beg: T→J as the beginning vertex of an edge and end: T→J as the ending vertex of an edge.

Define R⊆J as the set of road segment endpoints in the map frame domain.

Define $G_R$ as the subgraph of G induced by R.

Define S⊆R as the set of road segment endpoints in the scaffold domain.

Define $G_S$ (the "scaffold subgraph") as the subgraph of G induced by S.

For graph H, define #Edges$_H$:Vertices(H)→ℵ as the number of edges in H incident on a vertex.

Define P as the set of walks in G: P=∪$_{n∈ℵ}$ {<$t_0, t_1, \ldots t_n$>}s.t. ∀i,end($t_i$)=beg($t_{i+1}$).

For path p=<$t_0, t_1, \ldots t_n$> and vertex r, define r∈p iff ∃i r=$t_i$.

Define beg: P→J as the beginning vertex of a path and end: P→J as the ending vertex of a path.

Define Paths: J×J→{P} as the set of paths from j to j' in G.

For p∈P and graph H, define p⊆H iff ∀t∈p, t∈Edges(H).

For paths p=<$t_0, t_1, \ldots t_n$>, p'=<$u_0, u_1, \ldots u_n$>, define p⊆p' iff ∃[$i_0, i_1$], [$j_0, j_1$]⊆ℵ s.t. ($j_1-j_0=i_1-i_0$ and ∀k∈[$i_0, i_1$], $t_k=u_{k+j_0-i_0}$) (that is, p' is a subpath of p).

Define CanRoute: R×R→Bool as indicative of whether there is a path from r to r' in $G_R$.

Define RoutingDist: T→R as the driving distance from one end of the segment to the other.

Define RoutingDist: P→R=$\Sigma_{t∈p}$ RoutingDist(t) as the driving distance from the beginning to the end of path p.

Define MinRoutingDist: R×R→R= min$_{p∈P\ s.t.beg(p)=r\wedge end(p)=r'}$RoutingDist(p) as the minimum driving distance from r to r' along any path in $G_R$.

Define MinBidirRoutingDist: R×R→R=min(MinRoutingDist(r,r'),MinRoutingDist(r',r)).

Define ShortestPath: R×R→P=argmin$_{p∈Paths(r,r')}$ RoutingDist(p).

For graph H, define IsPathIsolated$_H$:P→Bool=whether ∀r∈p s.t.r∉{beg(p),end(p)},#Edges$_H$(r)=2 (that is, whether there is any junction along p in H other than possibly at either end).

Define I as the set of route instances corresponding to logs input to a particular run of the map builder. Each route instance i∈I defines a path $p_i$⊆G.

Given I, define $P_I=∪_{i∈I}$ {r∈$p_i$} as the set of road segment endpoints included in I.

Define $G_P$ (the "plan subgraph") as the subgraph of G induced by $P_I$.

Define the route plan domain C⊆Edges($G_R$).

Scaffold Domain

The scaffold domain has a number of desirable properties that will, in general, conflict. The following explains how score functions may be defined for the properties for optimization purposes. For example, a sample embodiment may try to optimize for some properties without attempting to satisfy them all. Some properties may be obtained naturally and are not necessarily evaluated in the mathematical manner described below. However, such properties are kept in mind when qualitatively evaluating the performance of the scaffolding algorithm.

Property 1: There should be no unnecessary convex holes in the outer shape of the map frame domain. If there is a road that could be included in the map frame domain and would significantly reduce the concavity of the domain (either at the edges or in a hole in the domain), it should be included. As an option, for some α not much larger than 1, require ∀r, r'∈R, ∃p⊆$G_R$ s.t. RoutingDist(p)≤α×RoutingDist(ShortestPath(r,r')).

Property 2: Each point on a road within the map frame domain should be within a maximum driving distance of its nearest scaffold point. This is typically a function of both distance and speed. As option 1, require ∀r∈R ∃s∈S, MinBidirRoutingDist(r,s)≤$d_{max}$. As option 2, minimize max$_{r∈R}$ min$_{s∈S}$ MinBidirRoutingDist(r,s).

Property 3: To make it easy for the route plan for scaffold data collection to be a single connected component and to allow computing distances from all points on the road to and from the scaffold, the graph of all directed road segments in the mapping domain should be connected (being strongly connected is not necessary). In other words, require ∀r, q∈R, CanRoute(r,q) ∨ CanRoute(q,r).

Property 4: All points on road in the map frame domain should be connected to the scaffold in many separate places to make it easy to anchor data within the partition to the scaffold later. Connectedness may be described as an average or minimum over all road segments in the map of how many connection points exist from the segment to the scaffold. For example, define IsScaffoldBlanket: R×S→Bool=whether it is possible to route from r to s ∨(or) from s to r on the directed road graph without touching any t∈S\s. Also, define ScaffoldConnectedness(r):

$$R \to R = \frac{1}{|R|}\sum_{r∈R}$$

$\Sigma_{s∈S}$ IsScaffoldBlanket(r,s). As option 1, require ∀r∈R, ScaffoldConnectedness(r)≥$c_{min}$. As option 2, maximize $\Sigma_{r∈R}$ ScaffoldConnectedness(r). In many cases, connectedness may be assumed to occur naturally and it is not necessary to optimize for connectedness.

Property 5: It should not take too long to actually cover the scaffold while collecting data. For example, the total routing distance of the set of route instances in the minimal-distance coverage plan may be required to cover each scaffold road segment once and is no more than L times the total driving distance of scaffold road segments.

Property 6: Use major roads when possible for heuristic reasons. As a result, there should be no sharp turns and no bumpy surfaces. However, there need not be a requirement to force the scaffold to match major roads in any way.

Property 7: Optionally, the scaffold should be as small as possible since there will be extra-strict requirements on its quality and it is undesirable to spend that effort on more sections of road than necessary. As an option, minimize $\Sigma_{t \in Edges(G_S)}$ RoutingDist(t). It is not necessary to minimize the scaffold size, although the scaffolding algorithm should stop as soon as enough data has been collected.

Property 8: It should be easy for routes to overlap the scaffold significantly during data collections for map updates. This is a heuristic. It is not necessary to optimize how easy it is for routes to overlap the scaffold as the overlapping typically happens naturally. Option: for each road segment endpoint r, there should be at least one drivable route of minimum length L starting/ending within routing distance $d_{max}$ (from or to) of r in the scaffold. In other words, require $$\forall r \in R, \exists p \subseteq G_S \text{ s.t.RoutingDist}(p) \geq L \wedge \min(\text{MinBidirRoutingDist}(r, \text{beg}(p)), \text{MinBidirRoutingDist}(r, \text{end}(p))) \leq d_{max}.$$

Route Plan/Log Set

The set of logs used in the scaffold map build run and/or the route plans for collecting those logs include a number of features as follows:

1. Plan Density: the undirected graph over road segments in the plan should not have any segments between junctions over a given distance (if possible). Thus, $\forall p \in G_P$, RoutingDist(p)≤d $\vee$ ¬IsPathIsolated(p). It is not necessary to optimize for plan density as it may be expected to occur naturally in some embodiments.

2. Plan completeness: the set of logs used in the scaffold map build run should cover all road segments in the scaffold with at least Nx coverage, where N is the speed-dependent number of passes required for map building. N>1 is needed for the loop closure requirement on the map build output, thus the minimum for N is 2. Setting the minimum number of passes through each scaffold lane may be as easy as driving though the scaffold lane more than once and such considerations need not be part of route generation.

3. There should be no unnecessary detours in any route plan. If there is a road that could be included in the route plan domain and would significantly reduce the concavity of the domain (either at the edges or in a hole in the domain), it should be included.

Option: for some α not much larger than 1, require $\forall r, r' \in P_I$,
 $\exists p \in P \subseteq G_P$ s.t. RoutingDist(p)≤α×RoutingDist(ShortestPath(r,r')).

4. Optionally, no route's expected driving time in the route plan should be longer than, for example, 2 hours (constraint on human drivers) or shorter than, for example, 20 minutes (sample minimum data collection requirement).

5. All logs should pass all pre- and post-map build per-log checks run in the map build pipeline. For example, there is not much missing sensor data and the resulting trajectories are smooth.

6. The expected and actual alignment distance to the scaffold should be small. No point in any route expected to be put through map building may have a best-case alignment distance from the scaffold more than a predetermined threshold distance. The best-case alignment distance assumes good alignment is produced wherever a route touches the prebuilt scaffold. Also, no point in any log put through map building may have alignment distance from the scaffold more than the predetermined threshold distance. As used herein, "alignment distance" is a distance through log(s) from a point to the closest scaffold point, allowing paths across points of alignment between logs and between a log and the map (either points at which alignment was run during map building or points at which resulting alignment is good regardless of whether alignment was optimized for that point).

Local Scaffolds

It will be appreciated that it may be desirable to map a local area rather than an entire city or geographic area so that the process of vehicle routing may start before the entire city or geographic area is mapped. However, the local mapping should be performed in a way that is consistent with the mapping for the entire city or geographic area. In such a case, it is desirable to generate what is referred to herein as "local" scaffolds that may be used to map a local region of the entire city or geographic regions. The local scaffolds may be combined over time to form a constellation around a city or geographic area until the mapping for the entire city or geographic area is completed.

To maintain global consistency, the local scaffolds otherwise satisfy the properties of scaffolds as set forth herein. However, a further property is imposed upon the local scaffolds which requires the local scaffolds to be separated by a threshold distance such that the local scaffolds will not need to be suppressed or contracted to fit together to form a larger scaffold including the local scaffolds. In other words, a buffer area is provided between the local scaffolds so that the local scaffolds are statistically independent. The buffer area may be defined by a distance, driving time, and the like. For example, in the case of the local scaffolds 1010 and 1020 of FIG. 10B, the buffer threshold is a driving distance of at least two kilometers between the respective local scaffolds 1010 and 1020. Once the routes to be mapped are closer to the local scaffolds than the threshold distance for the buffer area, then the local scaffolds may be merged into a larger scaffold that connects together the local scaffolds. In the example just given, if the routes are within two kilometers, then the local scaffolds 1010 and 1020 are merged. Similarly, if two local scaffolds are to be generated that are within the threshold distance, a single scaffold is generated that includes the two local scaffolds.

The distance between the respective local scaffolds may be estimated by comparing the log data for the respective local scaffolds to find how the logs differ and the deviations in the data sets based on distance. The closest point on a polygon and/or point cloud defining a set of log data for a local scaffold is compared to the closest point on a polygon and/or point cloud defining a set of log data for another local scaffold to find the minimum distance between any given pair of points on respective local scaffolds. If all points satisfy the distance requirement, then the local scaffolds are acceptable as statistically independent from each other. In sample embodiments, the precision of such calculations is a function of distance between the local scaffolds. For example, an error of less than 0.5% may be the error limit when the original GPS data in respective scaffolds is roughly in the correct space and some degree of stretching the data to fit the larger scaffold is desirable. When the local scaffolds are far enough apart so that there is room to stretch or compress the local scaffolds without producing noticeable local distortion in the local scaffolds, then the local scaffolds may be merged into a larger scaffold. In the case of such a scaffold merge, the local scaffolds as well as the larger scaffold all adhere to the noted scaffold requirements, and the data sets may be optimized for separation to permit valid configurations that satisfy all requirements including the threshold distance for the buffer area between scaffolds.

When the local scaffolds do not satisfy the threshold distance for the buffer area and are to be merged and/or an existing local scaffold is to be merged with a new area for mapping, a merge algorithm may be implemented that accepts user specified areas to be covered by the larger scaffold (with as little additional material as possible). The convexity and other requirements such as local scaffold separation are maintained and the lanes iterated until all scaffold requirements are satisfied.

Log Trajectory Estimation Output

Since every piece of road included in the scaffold needs>1× coverage, it is easy to satisfy a requirement that within each log the separation between each pair of temporally consecutive loop closures (union of loop closures to other new logs and to the map) is less than D (e.g., 100 meters) except when the vehicle is thought to not be in the route plan domain (to allow for going to/from garages). An association algorithm may be implemented to estimate when a trajectory coincided with and aligned to the scaffold. In general, the association algorithm matches sensor data taken from time T in the new trajectory to sensor data from sampled times T1, T2, . . . TN from trajectories that have already been added to the map (of which the scaffold is a part). If data from T and T1 match, it is known that one is at the same position at T as at T1. Because the old trajectory is already in the map, the position of T1 in the map is known. The underlying algorithm is the same as for LIDAR alignment 340 discussed above. The scaffold should contain at least one place where localization initialization is possible.

Scaffold Algorithm

The scaffold domain is defined by a tool that will run on a coverage map and produce something like a list of coverage lanes (corresponding to extent segments) to include in the scaffold. The tool may also produce a coverage plan, or a separate tool may be run on this tool's output to get a plan. However, a different domain definition may be used as appropriate within the guidelines set forth above.

What the scaffold domain tool needs to output for map building purposes is:

1. The set of coverage lanes or road segments in the scaffold domain.

2. The set of all coverage lanes or road segments in the map frame domain (a subset of lanes within the perimeter).

3. An optional spanning tree in the map frame domain graph may be used for the set of coverage lanes or road segments in the scaffold domain. Route plans for scaffold data collection may be generated separately.

The generated scaffold should be a sparse as possible and should be a single connected-component. Major roads should be used where possible.

Initial Building of Scaffold

The steps involved in building the scaffold along with considerations for each are described below.

1. Map frame domain definition (with knowledge of scaffolds) by creating a latitude/longitude polygon enclosing the entire area expected to ever be mapped for a geographical area. The map frame domain will be the largest connected component of road segments inside that boundary, where connectedness is defined using only road segments entirely enclosed by the boundary. In sample embodiments, the map frame domain is not only defined by an inclusion polygon (i.e. everything inside is part of the domain) but also by a set of exclusion polygons (i.e. everything inside is not part of the domain) and exclusion lanes (i.e. particular road lanes that are to be excluded from the domain).

2. Extent generation/coverage map creation before running the scaffolding algorithm (knowledge of scaffolds not needed) includes running coverage planning on coverage maps and that data in coverage maps is mappable to the equivalent data in the maps to be provided to the vehicles. A graphical user interface (GUI) may be used to define sets of extent segments (or equivalent datatype) with different properties for things like "do not need to be auto-capable" or "in scaffold."

3. Validation of map frame domain and scaffold domain (with knowledge of scaffolds) may be performed on the coverage map to validate that there is no road graph information in the map provided to the vehicles.

4. Route planning (with knowledge of scaffolds) may be run automatically on a list of required, optional, and forbidden lanes to output a route that visits all of the lanes at least once. Automatic checks may be run on the plans before the plans are validated. This step is scaffold-specific. A spanning tree for the scaffold also may be provided to create routes that may be tested against the above requirements. Another option is to use partitioning to split the map into smaller areas where the routing algorithm may be run more efficiently. Each route may be run any number of times to get the desired Nx coverage. The route is provided to the data collection process as a written description or additionally as a data structure.

5. Validation of route plans (with knowledge of scaffolds).

6. Data collection, which does not need knowledge of scaffolds. Tools may be used to help data collectors figure out whether they are overlapping the scaffold enough in the current log or a current set of logs, but such tools are not required.

7. Absolute accuracy constraint creation (with knowledge of scaffolds for deciding where to add constraints) is performed because absolute accuracy constraints can be used when extending the scaffold. Absolute accuracy constraints are also needed when creating the scaffold. These constraints and those used when extending should all come from the same source.

8. Mapping log selection (with knowledge of scaffolds) includes placing logs collected for scaffolding in a log set and optionally adding tags in a catalog of logs for ease of human searching. A log selection viewer may then be used to help select a set of logs for each map build (not specific to scaffolds). The catalog of logs may be searched only for logs marked for-use-in-scaffolding, which permits collection of more logs than the minimum needed. A minimal subset may be selected for each attempt to finish the map build to account for the possibility that some fraction of logs will have issues and it would not be desirable to run several data collections.

9. Verification of the proposed map build input log set.

10. Perform the log trajectory estimation (with enhancements that have knowledge of scaffolds, but the core optimizations do not need knowledge of scaffolds). A pipeline wrapping the map build pipeline may be used to add scaffold-specific functionality. It is noted that various steps during a map build may have the ability to reject logs. During a scaffolding run this should result in termination of the map build run, and these logs are added to a log set so that these logs may be avoided for scaffolding. The remaining log set will then be revalidated, and if that fails, the process returns to log selection. The set of logs that successfully make it through the scaffolding map build run may be put into a log set, which may be added to later. A pipeline is then run iteratively, redoing log selection and log set validation as necessary. Validation may be put into the pipeline as desired.

11. Perform initial stages map building (with knowledge of scaffolds within individual tools but not at a pipeline level). Some map validation failures will result in marking some logs not usable for scaffolding, at which point the process restarts from the log selection step unless the remaining set of logs/route plans passes all validation. All logs used in this build are scaffold logs. No non-scaffold data is mixed in during the initial map building. A pipeline is run iteratively, redoing log selection and validation as necessary.

Scaffold Generation

Figure 11:
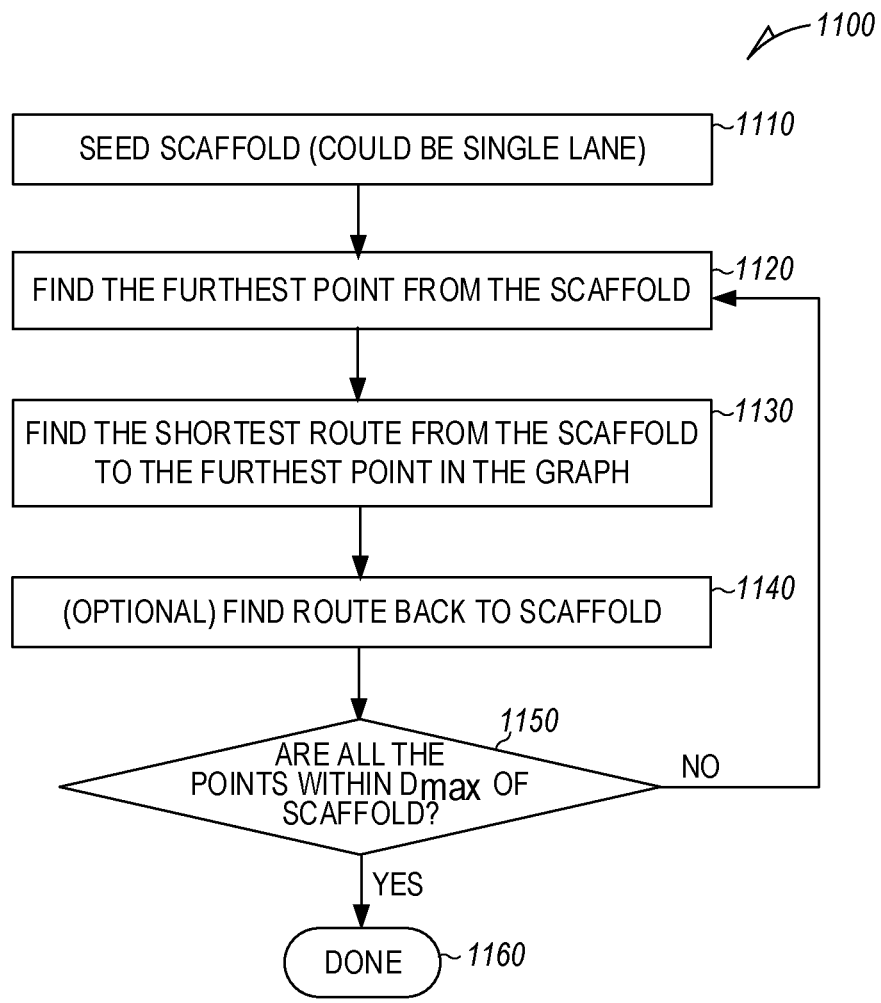
FIG. 11 illustrates a flow chart of a sample algorithm for generating a scaffold in a sample embodiment.
Figure 12A:
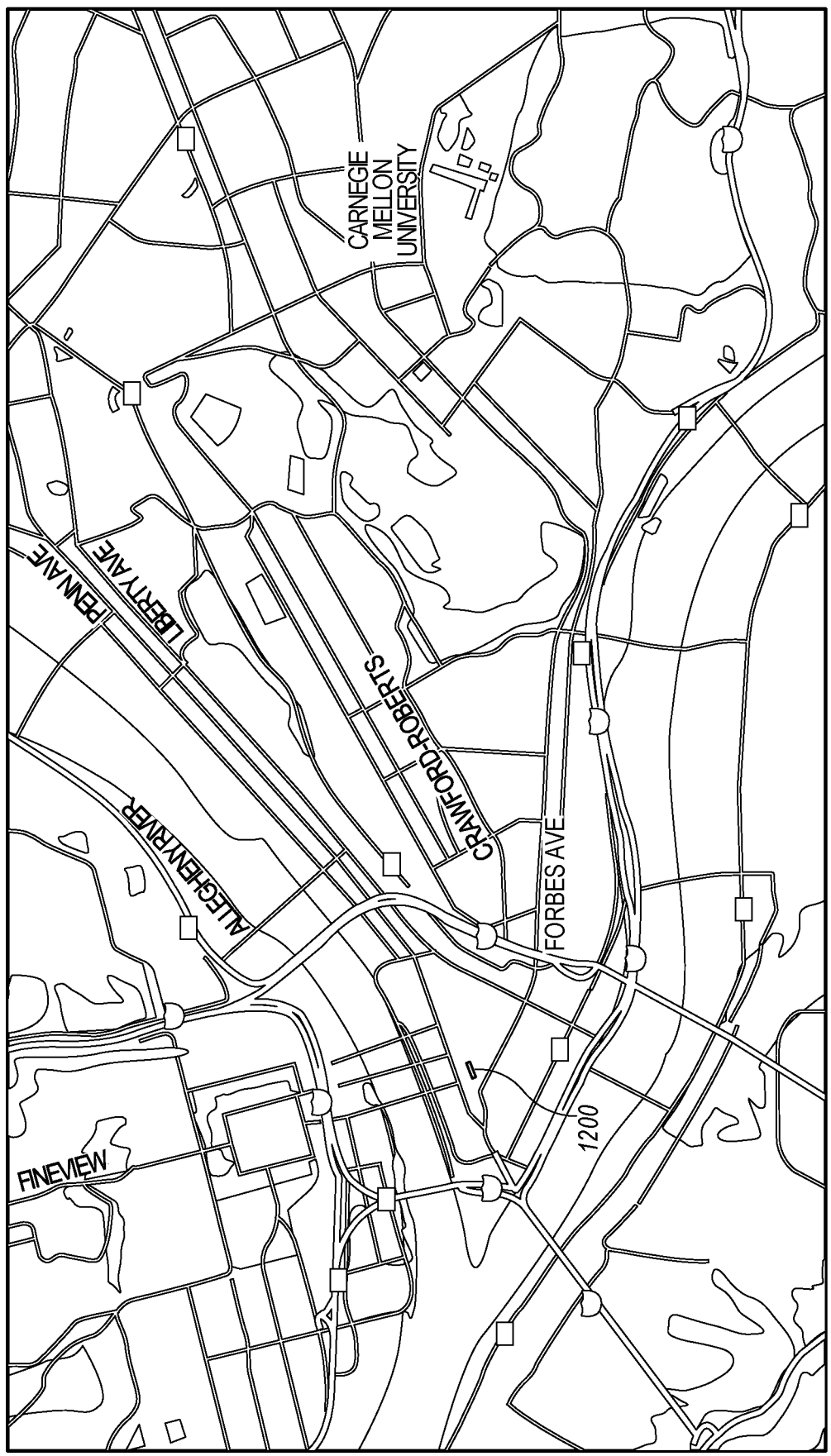
FIGS. 12A-12F illustrate iterative generation of a scaffold in accordance with the sample algorithm of FIG. 11.
Figure 12B:
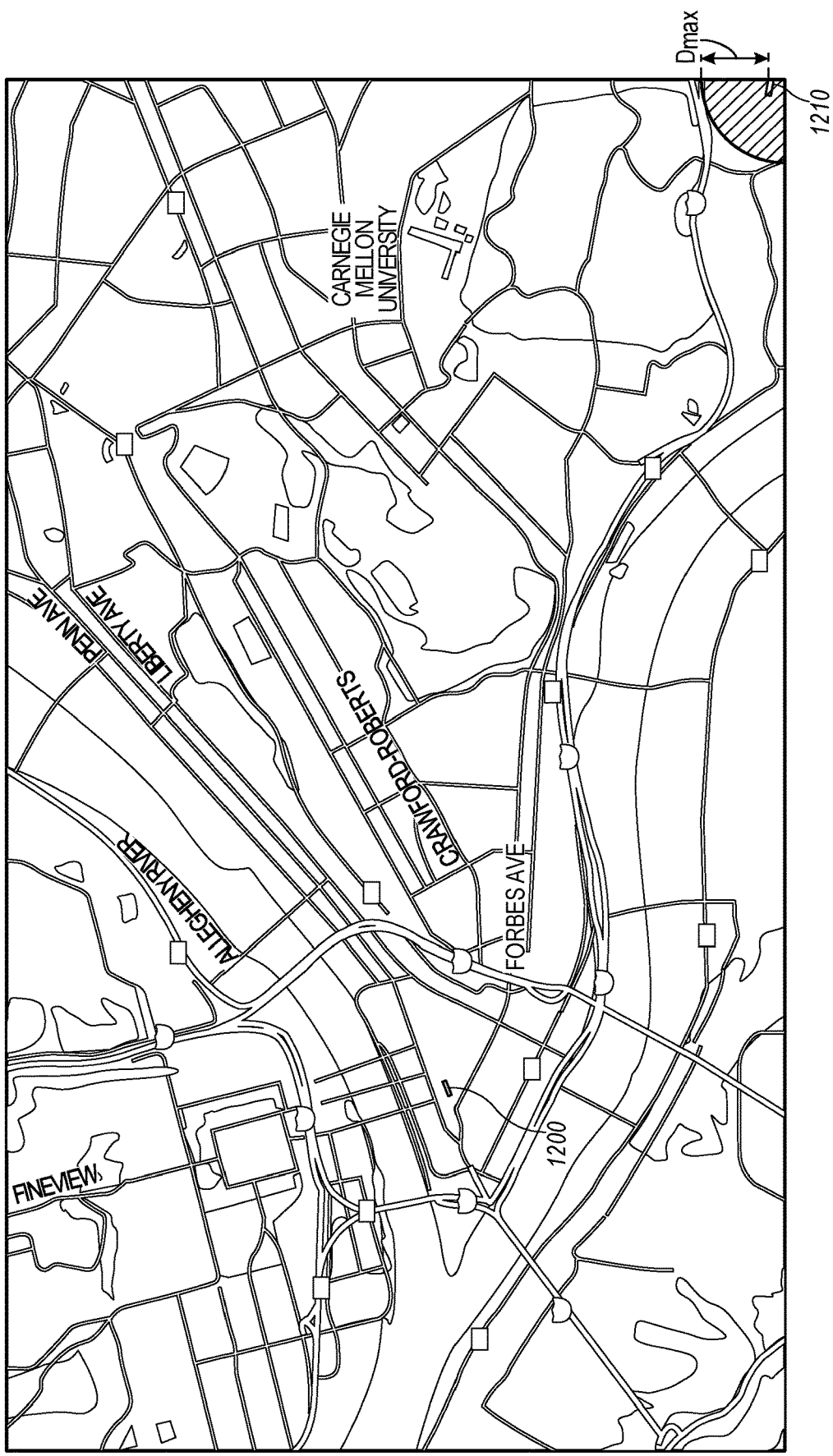
Figure 12C:
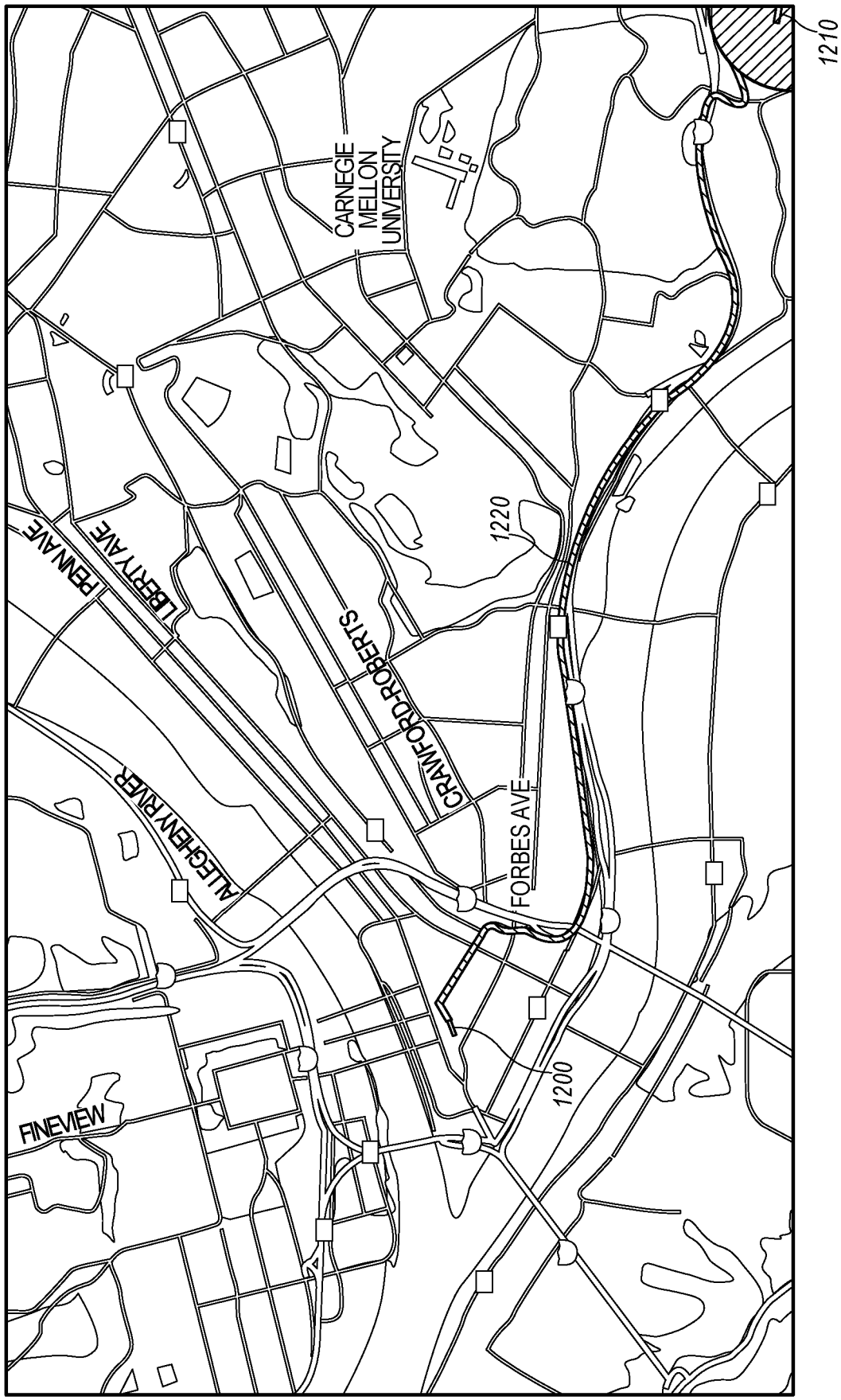
Figure 12D:
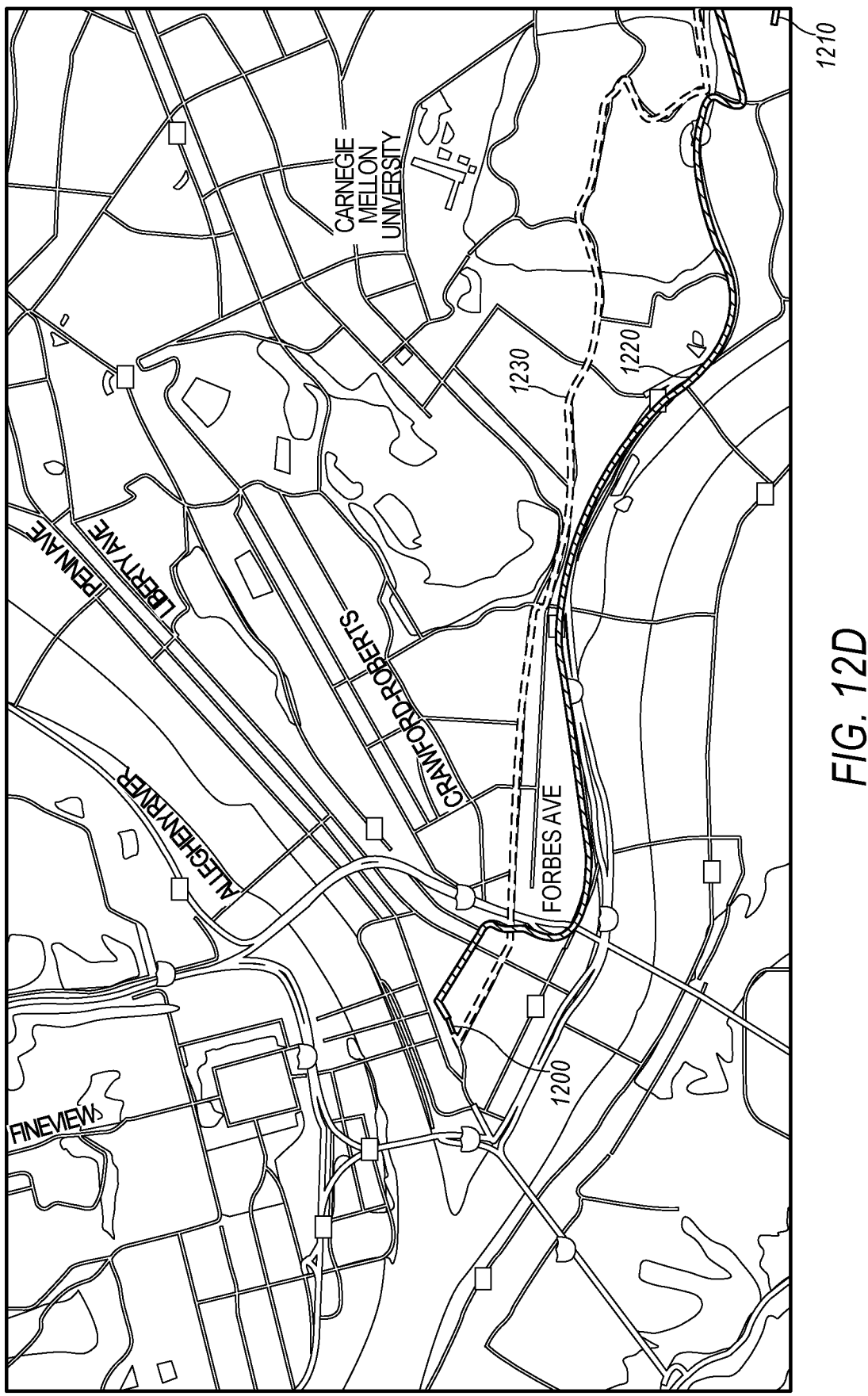
Figure 12E:
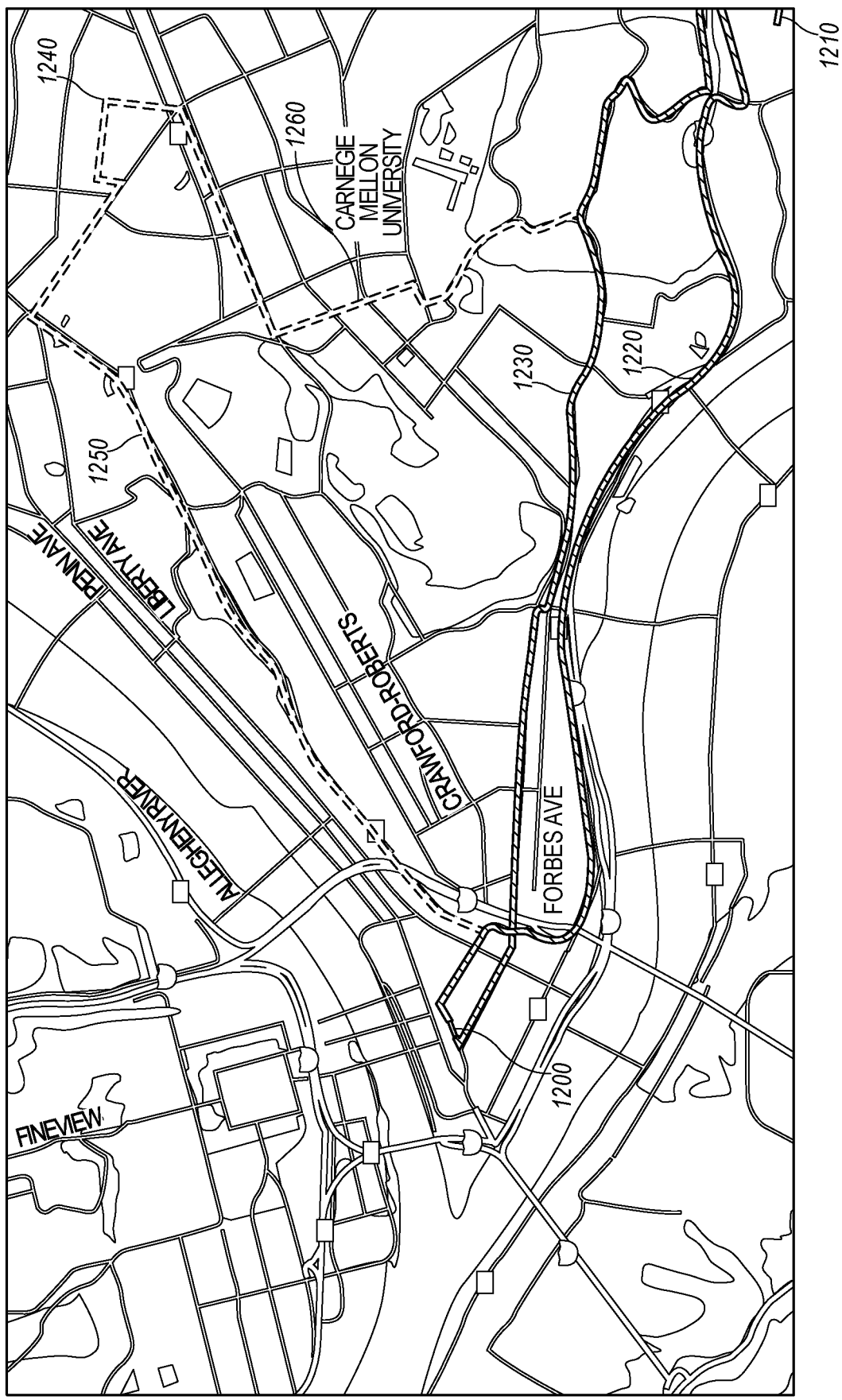
Figure 12F:
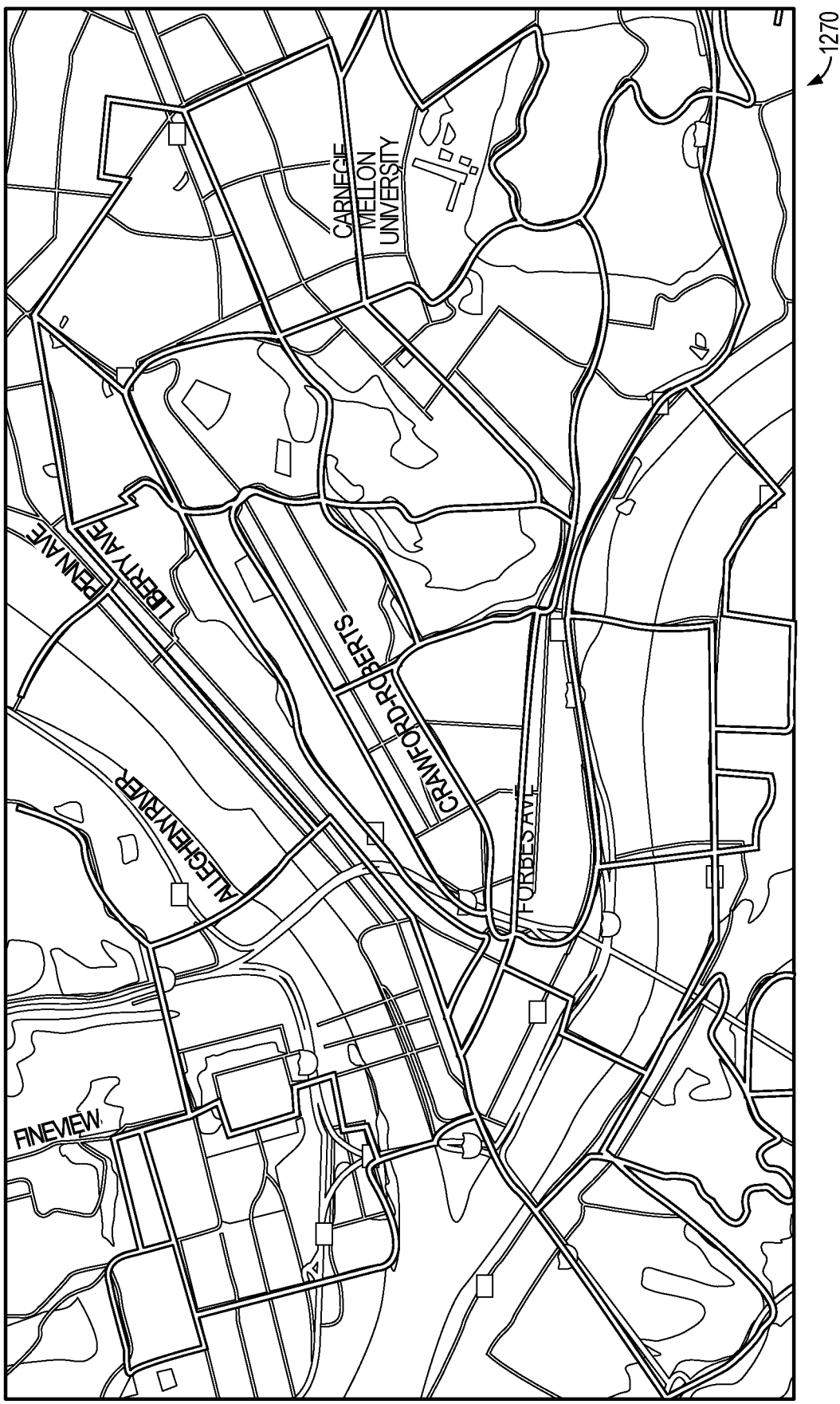

FIG. 11 illustrates a flow chart of a sample algorithm 1100 for generating a scaffold in a sample embodiment, and FIGS. 12A-12F illustrate iterative generation of a scaffold in accordance with the sample algorithm of FIG. 11. As illustrated, a seed scaffold (which could be a single lane or high traffic lanes) 1200 (FIG. 12A) is provided at 1110 from a set of directed road segments in an area that may be covered by a map, and the furthest point 1210 (FIG. 12B) from the seed scaffold is found at 1120. The algorithm 1100 then finds the shortest route 1220 (FIG. 12C) from the seed scaffold 1200 to the furthest point 1210 in the road graph at 1130 to form a part of the scaffold using a conventional path finding algorithm. It is noted that the route need not extend all the way to the furthest lane 1210 for the furthest lane 1210 to be covered by the scaffold. Optionally, the scaffold algorithm 1100 may also generate a return route 1230 (FIG. 12D) back to the seed scaffold 1200 as part of the scaffold at 1140. In sample embodiments, the return route 1230 does not follow the same route 1220 generated from the seed scaffold 1200 to the furthest point 1210. For example, a different cost function may be used that would discourage driving too close to the outgoing route and that minimizes the size of the scaffold. The cost function makes it so that the lanes that are now covered by the returning route are not the same as the ones that were covered by the outgoing route. Otherwise, the outgoing and incoming routes could take the same roads in a two-way street, which would not be particularly helpful in generating the scaffold. At 1150, the scaffold generating algorithm 1100 checks that all points in the road graph are within a maximum driving distance $d_{max}$ (the point with the highest cost to reach, where $d_{max}$ is provided as an input parameter) from the scaffold as determined, for example, by applying Dijkstra's algorithm to the road graph segments. If so, the scaffold generating algorithm 1100 finishes at 1160; if not, the furthest point in the road graph from the scaffold is determined at 1120, and 1120-1150 are repeated to grow the scaffold until all points are within the distance $d_{max}$ of the generated scaffold. For example, a second iteration may find furthest point 1240 at 1120, find shortest route 1250 at 1130, and find return route 1260 at 1140 as shown in FIG. 12E. The process 1100 is repeated until a scaffold 1270 (FIG. 12F) is generated that encompasses the entire set of road graph data.

Thus, the scaffold algorithm 1100 selects directed road segments from lane sets in a road graph and builds a scaffold domain. The input includes the road segments to include in the scaffold frame domain and the map frame domain. From the road segments, a map frame domain and a scaffold domain are generated. Routes for filling out the scaffold domain and then the map frame domain are selected to fill out the regional map. In other words, once the scaffold has been generated, the mapping vehicles are then routed over the scaffold to collect the scaffold data. A set of routes is generated that visits all of the scaffold lanes at least once in a manner that is optimized to minimize the total amount of driving required. Generally, the scaffold may be split into routes that take a predetermined amount of time to run. The different routes for collecting the scaffold data optionally may be selected to overlap so that there is at least one "large" overlap every designated number of meters along a route. Also, each route may be a loop to simplify data collection. The generated scaffold is within a specified maximum driving distance from all points in the geographic area covered by the road graph.

Figure 13:
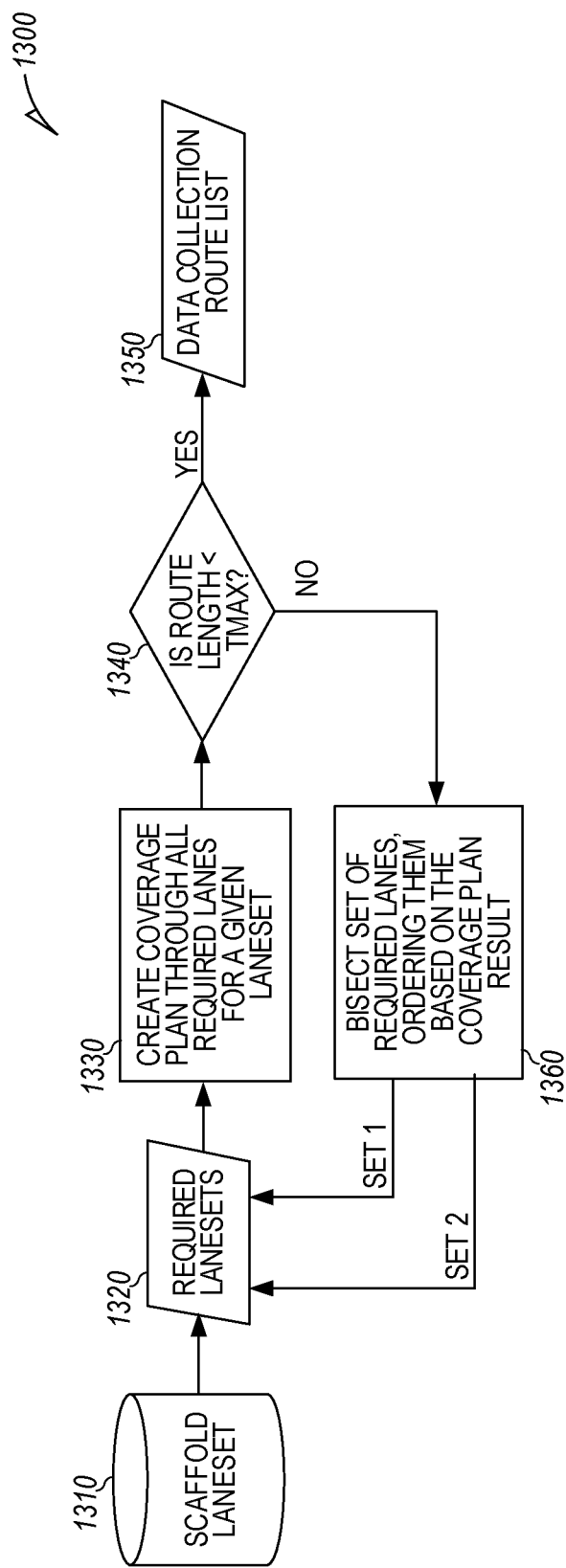
FIG. 13 illustrates a flow chart of an implementation of scaffold routing in a sample embodiment.

FIG. 13 illustrates a flow chart of an implementation of scaffold routing in a sample embodiment. As illustrated, to generate the scaffold routes, the required lane sets 1320 to be included in the map for a given geographic area are taken from a database of scaffold lane sets 1310. The required lane sets 1320 may be determined, for example, as the scaffold lanes that have not been visited. These scaffold lanes may be divided into different sets (especially after running through the flow chart once when the remaining scaffold lances are split into two sets). The routable lanes (e.g., excluding U-turns, unprotected lefts, etc.) are provided to a coverage (route) planner along with cost information (e.g., length of the lane or the time it takes to traverse the lane) to generate a coverage plan through all the required lanes for the given lane set at 1330. The route may be optimized to visit all of the required lanes at least once via respective loops (e.g., no spanning trees or dead ends in the route). If the length of the generated route is less than $t_{max}$ (e.g., may be driven in less than $t_{max}$=2 hours) at 1340, the generated route is added to the route list 1350 for use as a route planning log set. However, if the route is longer than $t_{max}$ at 1340, then the generated route is bisected at 1360 and the routes are ordered based on the coverage plan result. The bisected lane sets (Set 1 and Set 2) are provided to the required lane sets 1320 to repeat the route generation process at 1330.

In sample embodiments, the route (coverage) planner 1300 in FIG. 13 performs two jobs. The first is to order the lanes by extracting the optimal route through them when the lane set is too large. The second is to produce the optimal route through the lane sets when the lane sets have an acceptable size. Bisection at 1360 may be performed either for lanes that are repeated (indicating an inner loop) or in areas where the route leaves the scaffold lane set. In any case, due to the length constraints for the routes, more than one coverage plan may be needed to generate the entire scaffold. Also, the coverage plan route may not just be split into subroutes because there might be a requirement for the subroutes to be loops. Instead, the set of required lanes may be iteratively split at 1360 to build smaller coverage plans until the subroutes satisfy the maximum length requirement.

In further sample embodiments, the route planner 1300 of FIG. 13 may merge short routes as long as the merged route can still be driven in a time less than $t_{max}$. This optimization reduces the overhead of having to collect data for a new route (e.g., the time it takes to set up the vehicle before collecting a log). Other optimizations may be used during generation of the scaffold that merge/break up individual routes based on routing costs in a manner designed to minimize the data collection effort.

Though not required, in a post-processing step, the lanes in the generated routes may be tested for overlap. For example, a generated route may have sections that overlap other routes, sections within a maximum acceptable distance from the overlap regions, and regions that are non-covered lanes that are at distances from the overlap regions that are greater than the maximum acceptable distance from the overlap regions. In such a case, all non-covered lanes are extracted. The routing algorithm (FIG. 13) is rerun with only the non-covered lanes as required lanes and the previously routed lanes as routable lanes. The new routes generated from these inputs may be appended to the original routes, thereby satisfying any overlap requirements. Also, the route planning may take into account the route distance from the scaffold to each road graph when filling in the map relative to the generated scaffold.

Updating the Map

There are two main considerations when adding to/updating a map with a scaffold: overlapping data and avoiding updating the scaffold. The set of logs used in updating should overlap the existing map significantly and never get too far from the scaffold. In the first iteration or two, this overlap will be accomplished by manually including some nearby scaffold in the area to be coverage-planned for, with the hope that the plan will touch the scaffold pretty often. If that is not good enough, the route planning process may be automated. To prevent the scaffold region from being corrupted over time by changing data such that it cannot reliably be used to localize, removing scaffold-derived log chunks are forbidden unless the scaffold is intentionally being updated. This does not prevent the map from changing in areas covered by the scaffold. Checking for changes and scheduling scaffold updates when the world does change in scaffold areas happens separately.

Scaffold Scenarios

Non-scaffold logs are added to a map to fill in previously unseen areas. Adding map elements to areas in the scaffold is not allowed. Parts of the new logs outside cells/road segments with existing map data do not produce new map data. The process is limited to road segments with existing data even if priors are built per cell rather than per road segment to avoid adding data in previously unbuilt regions within a cell. All directed road segments with new log intervals associated with them may be required to be in the map frame domain. This may require having associated logs with road segments.

Existing regions of the scaffold are read-only in order to avoid introducing inconsistent geometry in them.

A previously unmapped area of map is built in the map frame domain or all logs are placed traversing a non-scaffold section of road because the map is out of date in that area. Chunks of data corresponding to removed non-scaffold logs are replaced but chunks of data corresponding to scaffold logs are not touched. All directed road segments with new log intervals associated with them may be required to be in the map frame domain. This may require having associated logs with road segments. Each overlap between a new log and the existing map lasts at least a minimum distance to aid in bootstrapping to the map. As long as there is a loop closure between the map and the new data, the log trajectory estimation process may work with the log.

The maximum distance (routing distance or traveled distance) between any point in any new log and the scaffold, using only mapped areas, is required to be less than $d_{max}$ (=the maximum routing distance any point in the map frame domain may be from the scaffold). In a first embodiment, map data is associated with road segments and routing distance is computed over these road segments plus those covered by the new log's route plan. This requires that the route plans for all logs used in map updating are available during the update pipeline run. On the other hand, expected routes may be obtained from logged messages. In a second embodiment, all map-to-non-map loop closures coming out of all log trajectory estimation runs in the map (at least those during intervals chosen to be chunks) are stored and traveled distance over intervals in logs between these loop closure points is computed. This embodiment is more accurate than the first embodiment because loop closures might not be obtained where hoped (e.g., near all intersections). Also, in the second embodiment, it does not matter how far the log ought to be from the map if a loop closure to the map is not actually obtained where expected (e.g., as soon as the logged pose was "in" the previously mapped area).

If the map is extended outside the initial map frame domain, there is a need to extend the scaffold. This is problematic, which is why the map frame domain is supposed to be very generous to start with, but scaffold extension may be desirable for large domains that cannot be covered in a single log trajectory estimation run given any processor, memory, or network usage constraints. An acceptable domain addition may be defined and an arbitrarily large section of scaffold may be replaced as long as absolute accuracy constraints are available in the replaced area. These constraints may be from the same source as the absolute accuracy constraints used during initial scaffold building. Alternatively, a "localization uncertainty" may be defined as a function of how far the vehicle is at any point in time from a) absolute accuracy constraint points, b) the scaffold, and c) other logs used in the same map building run. This quantity then may be required to never go below a threshold. All the same connectedness requirements as in the initial scaffold building may apply on the set of non-invalidated scaffold logs plus new logs. All logs being added in this process are scaffold logs. Changes to the map frame domain and/or the regions of scaffold to be removed are defined and some areas of the scaffold are marked as editable by this one build, or on the map copy used by this build. The map frame domain and the scaffold domain are redefined, and the requirements noted above are tested against the new domain and against the combined set of route instances/logs from the initial and the additional data collection. After running the log trajectory estimation, map data in the updated scaffold domain is marked as being the scaffold. Intervals of the new logs to be part of the scaffold may be selected by, for example, using chunking to associate logged poses with points on road segments. When a section of scaffold is invalidated, intervals in all non-scaffold logs that do not pass an alignment distance test also may be invalidated. This may drop coverage of some areas near the affected scaffold area, but it does not affect the validity of any other logs.

All logs traversing a section of scaffold are replaced because the map is out of date. This is done by removing some scaffold log intervals and the corresponding pieces of scaffold domain from the map and then extending the scaffold using the same process as when the map frame domain is extended.

Figure 14:
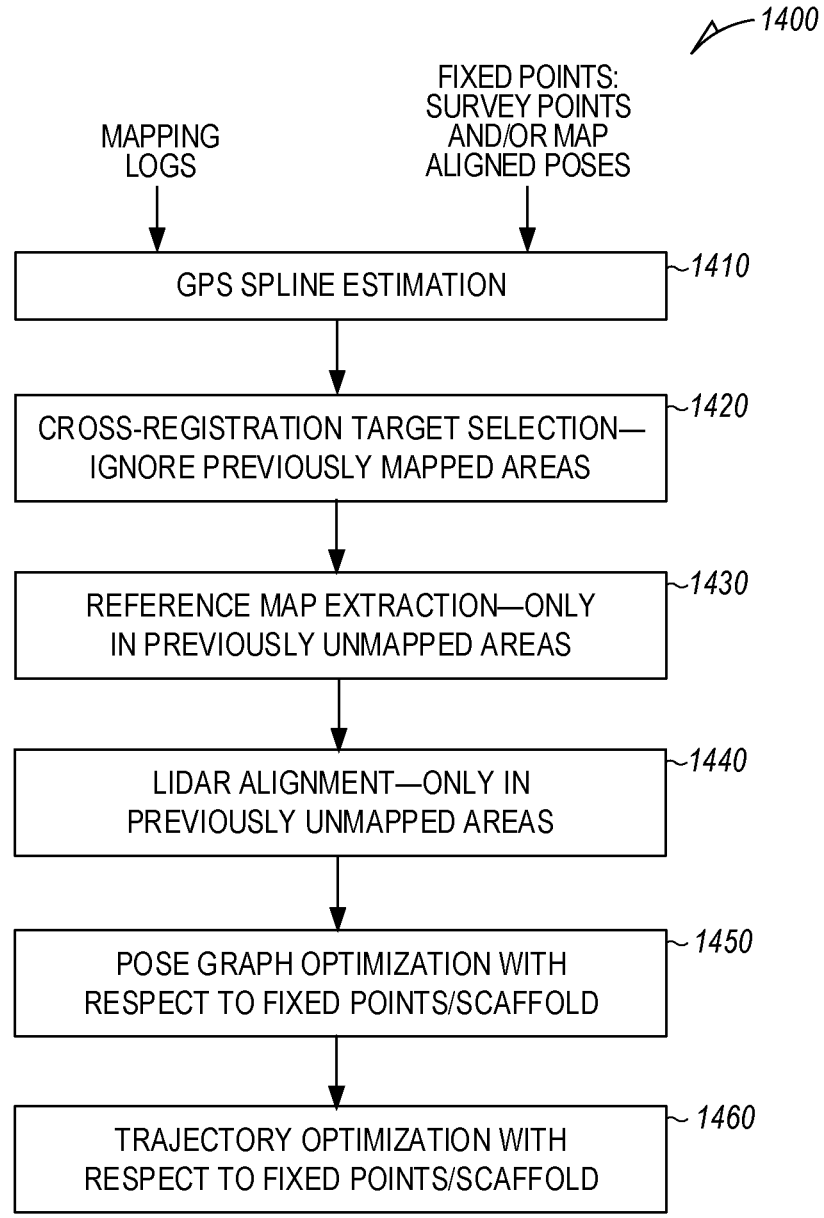
FIG. 14 is a flow chart modifying the georeferenced offline trajectory optimization pipeline of FIG. 2 to include log trajectory estimation for globally consistent maps according to examples described herein.

FIG. 14 is a flow chart modifying the georeferenced offline trajectory optimization pipeline of FIG. 2 to include log trajectory estimation for globally consistent maps according to examples described herein with respect to FIG. 5. As with respect to FIG. 2, while operations of the pipeline are described as being performed by specific components, modules or systems of the AV management system 130, it will be appreciated that these operations need not necessarily be performed by the specific components identified and could be performed by a variety of components and modules, potentially distributed over a number of machines. Accordingly, references may be made to elements of the AV management system 130 for the purpose of illustrating suitable components or elements for performing a step or sub-step being described but are not limited thereto.

The georeferenced offline trajectory optimization pipeline 1400 including log trajectory estimation for globally consistent maps in sample embodiments include GPS spline estimation (1410), cross-registration target selection (1420), reference map extraction (1430), LIDAR alignment (1440), pose graph optimization (1450), and trajectory optimization (1460). However, the pipeline 1400 receives not only the mapping logs from the mapping vehicles but also data representing fixed points in the form of survey points (that may or may not be absolutely accurate survey points) on a known map and map aligned poses that are related back to existing map areas. As described above, the data representing fixed points on a known map provides reference points for the unmapped area. For example, the fixed points may be a scaffold, survey points including aerial survey points, manhole covers, and the like in known mapped areas adjacent the unmapped area. The georeferenced offline trajectory optimization pipeline 1400 uses the data representing fixed points as well as data from logs previously generated by vehicle sensors from a fleet of mapping vehicles and identifies sets of sensor measurements for a geographic region taken at different times and references the data to known fixed points in known mapped areas. The sets of sensor measurements include environment geometry data and trajectory data in local coordinate frames. The georeferenced offline trajectory optimization pipeline 1400 aligns the environment geometry data between sets of sensor measurements, and, based on the alignment of the environment geometry data, non-rigidly transforms (e.g., bends/warps) the identified corresponding trajectory data into a common coordinate frame including the fixed reference points. The georeferenced offline trajectory optimization pipeline 1400 may then amend the sensor logs with the updated trajectories, which a map building process may use to generate accurate localization maps for autonomous or semi-autonomous vehicle operation.

In GPS spline estimation 1410, for each vehicle sensor log, trajectory data from the vehicle's inertial measurement units (IMU), wheel speed encoders, and GPS unit are combined and analyzed to yield a spline trajectory. As with respect to the embodiment of FIG. 2, the splines may include velocities (linear and rotational) and accelerations (linear and rotational). However, as described with respect to FIG. 5 and illustrated with respect to FIG. 6, the splines are adapted to connect the vehicle trajectory data to certain of the fixed reference points or scaffold.

As in the embodiment of FIG. 2, the cross-registration target selection process 1420 attempts to find locations where it appears there are multiple splines within threshold physical distances to each other. These candidate locations, also known as loop closure opportunities, alignment targets, or registration target events, are where multiple vehicles likely drove or where the same vehicle likely drove more than once. The cross-registration target selection process 1420 operates like the corresponding process in FIG. 2 except that the previously mapped areas are ignored.

The reference map extraction process 1430 extracts a small reference map for each of the registration target events including, for example, extracting from the vehicle logs LIDAR data around the time of the registration target event (e.g., a few seconds before and after the event). The reference map extraction process 1430 operates like the corresponding process in FIG. 2 except that the previously mapped areas are ignored.

As in the embodiment of FIG. 2, the LIDAR alignment 1440 attempts to find a transformation between each LIDAR keyframe and its corresponding reference map using LIDAR geometry data. This transformation may be represented as a pose and its uncertainty. However, unlike the embodiment of FIG. 2, the LIDAR alignment 1440 aligns LIDAR data in the vehicle logs to reference maps that may include a scaffold or fixed reference points that tie the LIDAR data in the vehicle logs to existing mapped areas that may, in turn, be tied to global coordinate systems. The LIDAR alignment 1440 may or may not distinguish a local reference map from a scaffold or any fixed data points, and the offline alignment process is the same. The LIDAR alignment 1440 otherwise operates like the corresponding process in FIG. 2 except that the previously mapped areas are ignored.

The pose graph optimization process 1450 reduces errors in the final log trajectories by pulling trajectories together wherever matches are found using the nodes and edges in the pose graph. The matches are data for physical locations that the pose graph optimization process determines are the same approximate place at different times and aligns these locations to the fixed reference points of the scaffold and/or fixed survey points. The process determines a spatial relationship between the nodes and gives a correction for each node in the graph, where in this embodiment the graph further aligns and optimizes the log data with respect to the fixed reference points.

The trajectory optimization process 1460 smooths trajectories in each log by combining logged trajectory measurement data from IMUs and wheel speed encoders with the corrected poses aligned with the fixed reference points. Trajectory optimization attempts to generate spline representations that satisfy each of these measurements and minimize error between them. For example, if the pose graph places two adjacent samples at a distance that conflicts with the IMU data, the trajectory optimization process combines the two by attempting to minimize the error in an optimization step. For each log, the trajectory optimization process 1460 outputs a new trajectory that is aligned to the other logs in a common reference frame that is aligned with the fixed reference points, which may be used to build a globally consistent map without fuzzy data or ambiguity.

Figure 15:
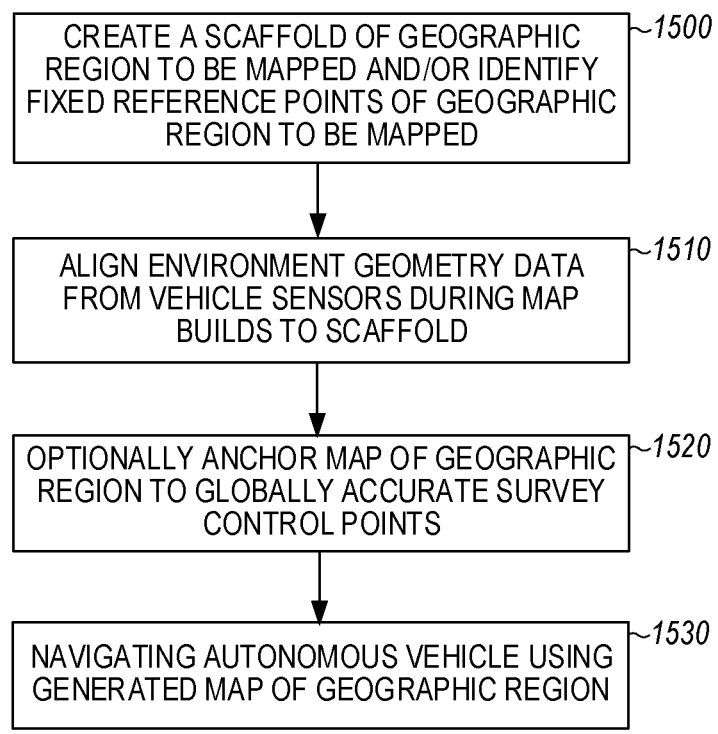
FIG. 15 is a flow chart describing a method of vehicle trajectory mapping for providing globally consistent maps according to examples described herein.

FIG. 15 is a flow chart describing a method of autonomous or semi-autonomous vehicle trajectory mapping for providing globally consistent maps according to examples described herein. Generally, the vehicle trajectory mapping for providing globally consistent maps is similar to that disclosed in FIG. 4 except that the common coordinate frame is aligned with fixed reference points or scaffolds of previously generated maps. To perform such alignment, a scaffold of a geographic region to be mapped during an initial map build is created and/or fixed reference points of the geographic region to be mapped are identified at 1500. Environment geometry data generated from vehicle sensors during subsequent map builds is aligned to the scaffold to generate a map of the geographic region at 1510. The alignment process may include using map data to provide estimates of where a vehicle in an unmapped area is located by generating a series of pose estimates relating back to fixed reference points in a previously mapped area. As explained further below, the map-aligned trajectories to constrain trajectories estimated for an unmapped area may be generated in a number of ways including by running a localization system of an autonomous or semi-autonomous vehicle against a previously generated map, by using map data from previously generated maps to create reference maps as the common coordinate frame, by running a localization system of an autonomous or semi-autonomous vehicle against a previously generated map and then running GPS spline optimization on the results of running the localization system against the previously generated map, by using multiple map build iterations where spline estimates are used in place of GPS trajectories in at least one map build iteration, and/or by running offline localization with GPS trajectory poses as initial guesses at edges of the unmapped area and an adjacent mapped area. Optionally, the map of the geographic region is anchored to globally accurate survey control points at 1520. The generated map of the geographic region is then provided to a vehicle at 1530 to enable the vehicle to navigate through the geographic region.

In sample embodiments, absolute accuracy may be incorporated into the map by using survey control points as the fixed reference points to anchor samples in the trajectory during the trajectory optimization steps described above. As used herein, a survey control point is a 2D or 3D point that has a known absolute location within some error bound of its ground truth location. Survey control points do not guarantee that the map will have perfect absolute accuracy. However, survey control points may help reduce the error between the estimate and the absolute ground truth, assuming they are reliable estimates themselves. Note that they only help reduce error if they originate from a common and consistent source to ensure that they are in a consistent frame.

In sample embodiments, there are several options for obtaining the survey control points referenceable to data collected on the vehicle. Appropriate survey control points include manual identification and association between ground truth imagery and the map build results. Professional surveyors using an RTK-localized terrestrial laser scanner (TLS; e.g., FARO or Leica brand) may produce a detailed point cloud of intersections or other interesting areas. This should be straightforward to integrate into the map build process as fixed reference maps. Survey control points may also include matching ground level 3D point clouds or imagery as measured on the vehicle to georectified aerial mapping data taken from aerial imagery, assuming a source of ground truth aerial imagery set exists. On the other hand, the survey control point could be something as simple as a manhole cover or something that may be translated to a manhole cover as detected by sensors of the vehicle.

Inappropriate survey control points may include existing survey markers such as steel disks commonly used in surveying. In some embodiments, these are not referenceable unless easily detectable in a vehicle's sensor suite. Also, anything that is likely to be removed or changed between when the survey data is acquired and when the log data is acquired is undesirable for use as a survey control point. In general, if survey control points move (e.g., refreshed aerial imagery), the map would need to be restarted from scratch, though it may be possible that some map production artefacts may be adjusted to the new map. In the event that the transformation between the old and new survey points may be approximated by a rigid transform, it may be possible to shift the coordinate frame rather than rebuilding (likely only reasonable for per-city maps).

The use of survey control points may be restricted to scaffold builds only. An example specification may include survey control points that may only be introduced in non-scaffold builds if a sufficient number/density were used originally in the scaffold build. Additional survey control points should originate from the same source as the scaffold survey points to maintain the global consistency invariant. Survey control points also may be used to safely extend scaffolds to outlying areas of interest, such as airports that are beyond the map of a city. The use of survey control points ensures that the map will be consistent where highways join with the original map. In some embodiments, the survey points may be used instead of the scaffold to align the collected poses in the unmapped area to the mapped areas.

In sample embodiments, a separate map will be built for each city/highway section. As a result, merging scaffolds from two or more nearby cities is not expected to be a required operation. However, once it becomes desirable to merge scaffolds, the following options are available. As a first option, if all of the maps being combined incorporated survey control points from a consistent source, the maps may be joined through a map build session as in the embodiment of FIG. 14 with connecting logs. If the distance between scaffold boundaries is large, the map build may be considered a scaffold build, respecting the requirements on coverage and survey control point density specified for regular scaffold builds. As a second option, the existing maps may be discarded and rebuilt starting from a new combined scaffold.

Highway maps do not have the same road network density requirements as cities, and as such the main highway lane itself may be considered a scaffold. Highways may be considered a special case where compact scaffolds cannot be created. Survey control points (such as interchanges and easily recognizable features) are used for reliable highway maps. How the highways connect to other highways and cities should be considered. Also, a particular concern for divided highways is ensuring correct alignment of the opposing directions of travel during the scaffold build. For this reason, highway exits that loop back to the highway should be included in the scaffold if they are intended to be mapped. Exits, towns, and depots that leave the highway and do not loop back may be optionally included in the scaffold collection.

The systems and methods described herein enable end-to-end execution of the process for generating globally consistent trajectories for logs and produce globally consistent maps. Such techniques allow further development and integration with other map building concepts and tools, including the use of alternative container models such as S2 cells, map build pipeline/workflow changes, use of a locking mechanism in the map build workflow to prevent consistency conflicts, and validation/testing/visualization/quality checks. The techniques described herein also enable a single concurrent build, or manual determination of permitted concurrent builds. Absolute accuracy improvements may be provided via survey control points in the scaffold. Initially, the survey control points may be manually selected, and a locking mechanism included in the map build pipeline. As required, the scaffold may be extended to a common worldwide coordinate frame (e.g., earth-centered, earth-fixed (ECEF)). Also, the survey control points may be automatically detected and/or selected from aerial imagery and the scaffold coverage may be used to plan for data collection.

It is generally desired that the maps for use by autonomous or semi-autonomous vehicles have locking and version control capabilities to ensure that map builds happen safely. Locking mechanisms ensure that concurrent map builds do not cover overlapping areas. In sample embodiments, the locking mechanism may include barring overlapping areas of the map from being built simultaneously and possibly adding a minimum distance between areas before they may be simultaneously built. On the other hand, version control enables erroneous changes to the map to be easily undone. In sample embodiments, the map version may be updated every time the map geometry is modified. The map may be updated and "merged" into the map sent to the vehicle for use if the newly created map passes a series of tests. Also, before adding a new map build to the map, the system may confirm that the part of the map near the build is unchanged from the version of the map that the map build was run on.

It will be appreciated that different roads and infrastructure between different cities do not lend themselves to a single data collection strategy that will work for all. Scaffold shape characteristics are specified and the data collect strategies should be parameterized by the following specifications:

Specification of the initial scaffold shape (compact convex hull with some minimum interior connectivity).

Specification of a minimum number of survey points in the initial scaffold if global accuracy is a requirement.

Specification of subsequent data collection routes to fill out the scaffold with a minimum specified overlap with the existing mapped areas.

An algorithm may be used determine if the interior scaffold roads meet density requirements given the scaffold outer boundary. Such an algorithm may check for a region growing from seed locations (Voronoi-like cells) and/or a recursive max-cut on an interior road graph. The algorithm may factor in higher costs for non-arterial roads and road switching.

It will be appreciated by those skilled in the art that global consistency enables additional use cases currently not easily handled by a globally inconsistent map. Such use cases include simulation, which uses engines that require a global map frame. Also, users that wish to render a global view of the map need a globally consistent map or else risk visually suboptimal results. Also, global consistency provides more flexibility for the underlying map representation. A globally consistent map may be broken up into submaps, cells, tiles, or streamed to consumers in a more continuous fashion. An abstraction layer should hide this internal representation from the end-user. Finally, in the case of a map represented as a submap graph, globally consistent trajectories eliminate the need for separate estimation of submap-to-submap alignment, which is a potential source of error in the mapping process. Global consistency may further simplify a submap graph representation in that the relative transform applied when transitioning from one submap frame to another is known exactly and therefore no additional uncertainty is introduced.

On the other hand, the requirement to maintain global consistency makes the map more brittle. If an action occurs that violates the global consistency invariant, and it is not caught, it is likely costlier to backtrack to the consistent state prior to the error being introduced. In other words, undo is more difficult when errors get introduced. Also, map building outside of the scaffold is risky. Maintaining global consistency requires that a sufficiently large portion of a mapping trajectory is localized to the city scaffold. This requirement prohibits building out new "arms" of the map (e.g., the route from Pittsburgh to the airport) as the route that is traveled will not easily be re-localized to the scaffold. One potential solution is to have a sufficient density of globally accurate surveyed points available on the route for global localization, but this approach adds a dependency on the availability of surveyed points. Moreover, this approach may not work in rural areas or cities without a good grid-like structure (i.e. plenty of intersections) without globally accurate survey points. Furthermore, this approach may not work well on highways without global reference targets. Straight lined highways do not present good targets for making a scaffold (which should be a compact shape).

In alternative embodiments, the map build solutions described herein could be augmented to reduce errors with an absolute frame and among map build runs using control points. This could potentially end up with a system where the map build runs are generally aligned with an absolute frame and allow easier transformation between map-relative and absolute coordinates, but without any global consistency/loop closure guarantees. Additionally, graph optimization may be run on submaps to allow for consistent closed loops and/or improved absolute accuracy. Also, instead of building rigid scaffolds, the scaffolds may be designed to bend when new data is acquired. Such bending increases the likelihood that newly inserted trajectories will not have to significantly warp to fit the existing scaffold. However, bending the scaffold requires potentially large pose graph optimizations to rebuild large portions of the map. Also, undoing errors may only be done by reverting to a previous stable version (throwing away all work since that version).

As another alternative, a single persistent map build session may be used for an entire city. Reference maps and pose graph edges are accumulated as new logs are added. In this approach, all map builds are consistent and significant warping of trajectories is not an issue. However, optimization of the accumulated pose graph becomes too large a problem to manage and map updates require optimization of an entire city rather than a small local area.

It will be further appreciated that the scaffold generation techniques described herein are considerably faster than conventional approaches and may be used for map-scale operations. The scaffold generation may start from any seed scaffold, including previously generated scaffolds. As a result, older scaffolds may be expanded or modified as necessary. Also, prior information such as artery roads may be used as a seed scaffold. In other examples, the scaffold may be made out of loops. Such an approach may introduce several advantages including strongly connected routes and easier routing. Due to their lower costs in route planning algorithms, the main arteries may be naturally chosen by the route planner to generate the scaffold as the routes to the furthest points from the seed scaffold are generated. On the other hand, if a loop requirement is relaxed, the routing algorithm may more efficiently split a coverage plan into overlapping routes. Also, the routing may be improved by considering constraints besides distance. Scaffold pruning also may be used to handle anomalies in the scaffold such as populated scaffold seeds and lever arms.

In other sample embodiments, an algorithm may be provided for satisfying the convexity requirement and merger requirements for the local scaffolds. Still other algorithms may be used for checking the density of the scaffold for use in map frame domain generation. In addition, the scaffold generation may be partitioned to speed up the map generation process.

Computer System

Figure 16:
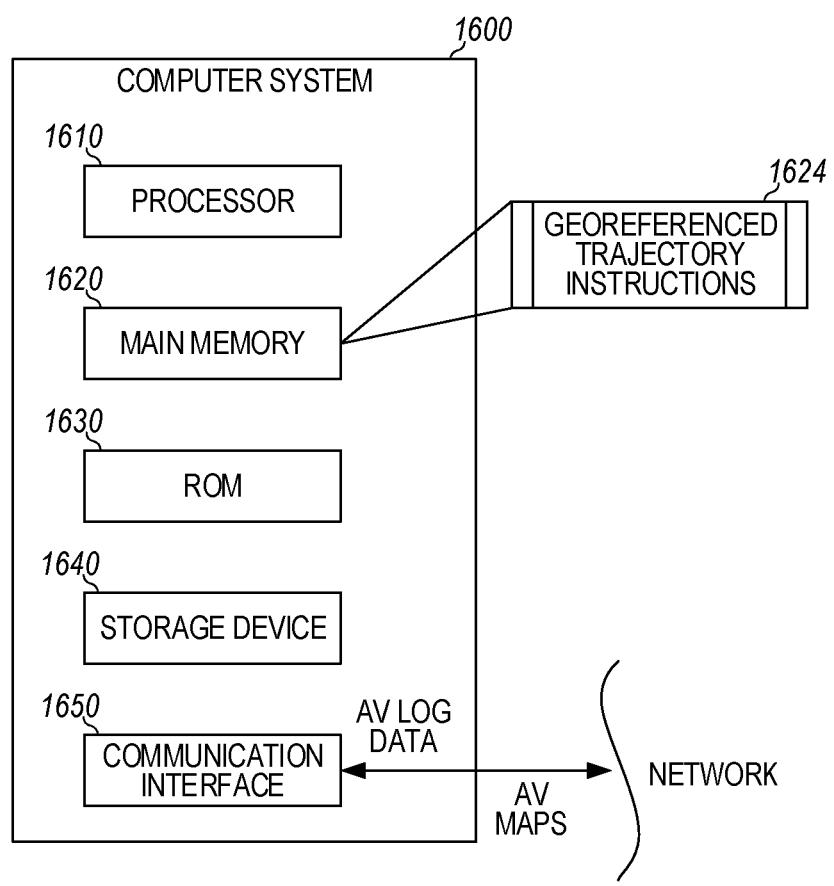
FIG. 16 is a block diagram illustrating a computer system upon which examples described herein may be implemented.

FIG. 16 is a block diagram that illustrates a computer system upon which examples described herein may be implemented. A computer system 1600 may be implemented on, for example, a server or combination of servers. For example, the computer system 1600 may be implemented as part of a network computer system for routing and operating autonomous and semi-autonomous vehicles. In the context of FIG. 1, the AV management system 130 may be implemented using a computer system 1600 such as described by FIG. 16. The AV management system 130 may also be implemented using a combination of multiple computer systems such as described by FIG. 16.

In one implementation, the computer system 1600 includes processing resources, a main memory 1620, a read-only memory (ROM) 1630, a storage device 1640, and a communication interface 1650. The computer system 1600 includes at least one processor 1610 for processing information stored in the main memory 1620, such as provided by a random-access memory (RAM) or other dynamic storage device, for storing information and instructions which are executable by the processor 1610. The main memory 1620 also may be used for storing temporary variables or other intermediate information during execution of instructions to be executed by the processor 1610. The computer system 1600 may also include the ROM 1630 or other static storage device for storing static information and instructions for the processor 1610. A storage device 1640, such as a magnetic disk or optical disk, is provided for storing information and instructions.

The communication interface 1650 enables the computer system 1600 to communicate with one or more networks (e.g., a cellular network) through use of a network link (wireless or wired). Using the network link, the computer system 1600 may communicate with one or more computing devices, one or more servers, and/or one or more vehicles. In accordance with some examples, the computer system 1600 receives AV sensor log data from a fleet of autonomous vehicles and transmits AV localization maps to the autonomous vehicles. The executable instructions stored in the memory 1630 may include georeferenced trajectory instructions 1624 to perform one or more of the methods described herein when executed.

By way of example, the instructions and data stored in the memory 1620 may be executed by the processor 1610 to implement the example AV management system 130 of FIG. 1. In performing the operations, the processor 1610 may handle receiving and storing AV sensor log data, calculating georeferenced trajectories, creating localization maps, and transmitting the localization maps to a fleet of AVs. The processor 1610 executes instructions for the software and/or other logic to perform one or more processes, steps, and other functions described with implementations such as described by FIG. 1 through FIG. 15.

Examples described herein are related to the use of the computer system 1600 for implementing the techniques described. According to one example, those techniques are performed by the computer system 1600 in response to the processor 1610 executing one or more sequences of one or more instructions contained in the main memory 1620. Such instructions may be read into the main memory 1620 from another machine-readable medium, such as the storage device 1640. Execution of the sequences of instructions contained in the main memory 1620 causes the processor 1610 to perform the process steps described herein. In alternative implementations, hard-wired circuitry may be used in place of, or in combination with, software instructions to implement examples described herein. Thus, the examples described are not limited to any specific combination of hardware circuitry and software.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

It is contemplated for examples described herein to extend to individual elements and concepts described, independently of other concepts, ideas, or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example may be combined with other individually described features, or parts of other examples, even if the other features and examples make no mention of the particular feature. Thus, the absence of describing combinations should not preclude claiming rights to such combinations.

Executable Instructions and Machine-Storage Medium

The various memories (i.e., 1620, 1630, and/or memory of the processor unit(s) 1610) and/or storage device 1640 may store one or more sets of instructions and data structures (e.g., instructions) 1624 embodying or utilized by any one or more of the methodologies or functions described herein. These instructions, when executed by processor unit(s) 1610 cause various operations to implement the disclosed examples.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1640 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal"

means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1624 may further be transmitted or received over a communications network using a transmission medium via the network interface device 1650 utilizing any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

EXAMPLES

In addition to the claimed georeferenced trajectory system, the examples include:

Example 1 is a method of globally consistent vehicle trajectory mapping, the method being implemented by one or more processors and comprising: creating a scaffold of a geographic region to be mapped during an initial map build; receiving sensor data generated by vehicle sensors of at least one vehicle; identifying, from the received sensor data, a set of sensor measurements for a geographic region taken by the at least one vehicle, the set of sensor measurements including environment geometry data for the geographic region and trajectory data for the at least one vehicle; aligning the environment geometry data with the scaffold; generating a map of the geographic region including the environment geometry data and the scaffold; and navigating a vehicle using the generated map.

Example 2 is a method as in Example 1 further comprising: aligning environment geometry data generated during subsequent map builds to the scaffold to generate a map of the geographic region.

Example 3 is a method as in any preceding example further comprising anchoring the map of the geographic region to globally accurate survey control points.

Example 4 is a method as in any preceding example wherein creating the scaffold of the geographic region to be mapped during the initial map build comprises receiving a set of road segments included in a domain of the scaffold and a set of road segments in a map frame domain the scaffold is to support mapping on, and updating the scaffold using the set of road segments included in the scaffold domain and the set of road segments in the map frame domain the scaffold is to support mapping on.

Example 5 is a method as in any preceding example wherein creating the scaffold of the geographic region to be mapped during the initial map build further comprises mapping the set of road segments in the map frame domain the scaffold is intended to support mapping on by creating a latitude/longitude polygon enclosing an entire area expected to ever be mapped for the geographic region, where the map frame domain is a largest connected component of road segments inside the map frame domain, and where connectedness is defined using only road segments entirely enclosed by the map frame domain.

Example 6 is a method as in any preceding example wherein creating the scaffold of the geographic region to be mapped during the initial map build further comprises running coverage planning and scaffolding algorithms on coverage maps having data that is mappable to equivalent data in the generated map to be provided to the vehicle.

Example 7 is a method as in any preceding example wherein creating the scaffold of the geographic region to be mapped during the initial map build further comprises generating route plans using a list of required, optional, and forbidden lanes to determine a route that visits each required lane in the list of required, optional, and forbidden lanes at least once and does not visit a forbidden lane.

Example 8 is a method as in any preceding example wherein creating the scaffold of the geographic region to be mapped during the initial map build further comprises creating absolute accuracy constraints for the scaffold.

Example 9 is a method as in any preceding example wherein creating the scaffold of the geographic region to be mapped during the initial map build further comprises placing logs collected for scaffolding in a log set and selecting from the log set a set of logs for each map build.

Example 10 is a method as in any preceding example wherein creating the scaffold of the geographic region to be mapped during the initial map build further comprises performing log trajectory estimation and performing a map building using the selected set of logs.

Example 11 is a method as in any preceding example wherein creating the scaffold comprises creating at least two local scaffolds within the geographic region to be mapped during the initial map build, wherein the local scaffolds are separated by a threshold distance.

Example 12 is a method as in any preceding example wherein creating the scaffold comprises creating a first scaffold within the geographic region to be mapped during the initial map build and merging a second scaffold within the geographic region with the first scaffold to form a larger scaffold that connects together the first and second scaffolds when the first and second scaffolds are separated by less than a threshold distance.

Example 13 is a method as in any preceding example wherein creating the scaffold comprises:
  (a) receiving as a seed scaffold at least one lane within the geographic region to be mapped during the initial map build;
  (b) determining a furthest point from the seed scaffold within a road graph of the geographic region;
  (c) finding a shortest route from the seed scaffold to the furthest point as part of the scaffold;
  (d) determining whether all points in the road graph of the geographic region are within a maximum distance $d_{max}$ from the scaffold; and
  (e) when all points in the road graph of the geographic region are within $d_{max}$ from the scaffold, completing the scaffold; otherwise, repeating steps (b)-(e).

Example 14 is a method as in any preceding example wherein creating the scaffold further comprises generating a return route back to the seed scaffold from the furthest point as part of the scaffold, wherein the return route does not follow the shortest route from the seed scaffold to the furthest point.

Example 15 is a method as in any preceding example wherein where $d_{max}$ is a distance in the road graph of the geographic region that has a highest cost to reach in a cost function used to generate the shortest route.

Example 16 is a method as in any preceding example wherein generating a map of the geographic region including the environment geometry data and the scaffold includes providing routable lanes from the road graph of the geographic region to a route planner along with cost information to generate a coverage plan through all the required lanes for the road graph and generating a set of routes that visits all lanes of the scaffold at least once in a manner that is optimized to minimize a total amount of driving required.

Example 17 is a method as in any preceding example wherein generating a map of the geographic region including the environment geometry data and the scaffold includes splitting the scaffold into routes that take a predetermined amount of time to run and that overlap every designated number of meters along a route.

Example 18 is a method as in any preceding example wherein each generated route is a loop.

Example 19 is a method as in any preceding example wherein generating a map of the geographic region including the environment geometry data and the scaffold includes identifying non-covered lanes that are at distances from overlap regions of routes that are greater than a predetermined maximum distance from the overlap regions of the routes, rerunning a route plan with the non-covered lanes as required lanes and previously routed lanes as routable lanes, and appending new routes generated for the non-covered lanes to the previously routed lanes.

Example 20 is a method as in any preceding example further comprising updating the generated map, wherein updating the generated map includes ensuring that no part of the selected logs that extends outside of a boundary of the scaffold will be incorporated into a new part of the generated map, limiting updating parts of the generated map that are part of the scaffold, and ensuring that each log intersects with the scaffold according to requirements including at least one of a number of overlap segments, a distance of overlap, and a maximum distance in a log from the scaffold.

Example 21 is a non-transitory computer-readable medium that stores instructions, executable by one or more processors, to cause the one or more processors to perform operations that comprise: creating a scaffold of a geographic region to be mapped during an initial map build; receiving sensor data generated by vehicle sensors of at least one vehicle; identifying, from the received sensor data, a set of sensor measurements for a geographic region taken by the at least one vehicle, the set of sensor measurements including environment geometry data for the geographic region and trajectory data for the at least one vehicle; aligning the environment geometry data with the scaffold; generating a map of the geographic region including the environment geometry data and the scaffold; and navigating a vehicle using the generated map.

Example 22 is a medium as in Example 21 further comprising instructions to cause the one or more processors to perform operations including: aligning environment geometry data generated during subsequent map builds to the scaffold to generate a map of the geographic region.

Example 23 is a medium as in Examples 21-22 further comprising instructions to cause the one or more processors to perform operations including anchoring the map of the geographic region to globally accurate survey control points.

Example 24 is a medium as in Examples 21-23 further comprising instructions to cause the one or more processors to perform operations including creating the scaffold of the geographic region to be mapped during the initial map build by receiving a set of road segments included in a domain of the scaffold and a set of road segments in a map frame domain the scaffold is to support mapping on, and updating the scaffold using the set of road segments included in the scaffold domain and the set of road segments in the map frame domain the scaffold is to support mapping on.

Example 25 is a medium as in Examples 21-24 further comprising instructions to cause the one or more processors to perform operations including creating the scaffold of the geographic region to be mapped during the initial map build by mapping the set of road segments in the map frame domain the scaffold is intended to support mapping on by creating a latitude/longitude polygon enclosing an entire area expected to ever be mapped for the geographic region, where the map frame domain is a largest connected component of road segments inside the map frame domain, and where connectedness is defined using only road segments entirely enclosed by the map frame domain.

Example 26 is a medium as in Examples 21-25 further comprising instructions to cause the one or more processors to perform operations including creating the scaffold of the geographic region to be mapped during the initial map build by running coverage planning and scaffolding algorithms on coverage maps having data that is mappable to equivalent data in the generated map to be provided to the vehicle.

Example 27 is a medium as in Examples 21-26 further comprising instructions to cause the one or more processors to perform operations including creating the scaffold of the geographic region to be mapped during the initial map build by generating route plans using a list of required, optional, and forbidden lanes to determine a route that visits each required lane in the list of required, optional, and forbidden lanes at least once and does not visit a forbidden lane.

Example 28 is a medium as in Examples 21-27 further comprising instructions to cause the one or more processors to perform operations including creating the scaffold of the geographic region to be mapped during the initial map build by creating absolute accuracy constraints for the scaffold.

Example 29 is a medium as in Examples 21-28 further comprising instructions to cause the one or more processors to perform operations including creating the scaffold of the geographic region to be mapped during the initial map build by placing logs collected for scaffolding in a log set and selecting from the log set a set of logs for each map build.

Example 30 is a medium as in Examples 21-29 further comprising instructions to cause the one or more processors to perform operations including creating the scaffold of the geographic region to be mapped during the initial map build by performing log trajectory estimation and performing a map building using the selected set of logs.

Example 31 is a medium as in Examples 21-30 wherein the instructions for creating the scaffold further comprise instructions to cause the one or more processors to perform operations including creating at least two local scaffolds within the geographic region to be mapped during the initial map build, and wherein the local scaffolds are separated by a threshold distance.

Example 32 is a medium as in Examples 21-31 wherein the instructions for creating the scaffold further comprise instructions to cause the one or more processors to perform operations including creating a first scaffold within the geographic region to be mapped during the initial map build and merging a second scaffold within the geographic region with the first scaffold to form a larger scaffold that connects together the first and second scaffolds when the first and second scaffolds are separated by less than a threshold distance.

Example 33 is a medium as in Examples 21-32 wherein the instructions for creating the scaffold further comprise instructions to cause the one or more processors to perform operations including:
(a) receiving as a seed scaffold at least one lane within the geographic region to be mapped during the initial map build;
(b) determining a furthest point from the seed scaffold within a road graph of the geographic region;
(c) finding a shortest route from the seed scaffold to the furthest point as part of the scaffold;
(d) determining whether all points in the road graph of the geographic region are within a maximum distance $d_{max}$ from the scaffold; and
(e) when all points in the road graph of the geographic region are within $d_{max}$ from the scaffold, completing the scaffold; otherwise, repeating steps (b)-(e).

Example 34 is a medium as in Examples 21-33 wherein the instructions for creating the scaffold further comprise instructions to cause the one or more processors to perform operations including generating a return route back to the seed scaffold from the furthest point as part of the scaffold, wherein the return route does not follow the shortest route from the seed scaffold to the furthest point.

Example 35 is a medium as in Examples 21-34 wherein $d_{max}$ is a distance in the road graph of the geographic region that has a highest cost to reach in a cost function used to generate the shortest route.

Example 36 is a medium as in Examples 21-35 wherein the instructions for generating a map of the geographic region including the environment geometry data and the scaffold includes instructions to cause the one or more processors to perform operations including providing routable lanes from the road graph of the geographic region to a route planner along with cost information to generate a coverage plan through all the required lanes for the road graph and generating a set of routes that visits all lanes of the scaffold at least once in a manner that is optimized to minimize a total amount of driving required.

Example 37 is a medium as in Examples 21-36 wherein the instructions for generating a map of the geographic region including the environment geometry data and the scaffold includes instructions to cause the one or more processors to perform operations including splitting the scaffold into routes that take a predetermined amount of time to run and that overlap every designated number of meters along a route.

Example 38 is a medium as in Examples 21-37 wherein each route is a loop.

Example 39 is a medium as in Examples 21-38 wherein the instructions for generating a map of the geographic region including the environment geometry data and the scaffold includes instructions to cause the one or more processors to perform operations including identifying non-covered lanes that are at distances from overlap regions of routes that are greater than a maximum distance from the overlap regions of the routes, rerunning the route planner with the non-covered lanes as required lanes and previously routed lanes as routable lanes, and appending new routes generated from the route planner for the non-covered lanes to the previously routed lanes.

Example 40 is a medium as in Examples 21-39 further comprising instructions to cause the one or more processors to perform operations including updating the generated map, wherein updating the generated map includes ensuring that no part of the selected logs that extends outside of a boundary of the scaffold will be incorporated into a new part of the generated map, limiting updating parts of the generated map that are part of the scaffold, and ensuring that each log intersects with the scaffold according to requirements including at least one of a number of overlap segments, a distance of overlap, and a maximum distance in a log from the scaffold.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims cannot set forth every feature disclosed herein, as examples may feature a subset of such features. Further, examples may include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A computing system, comprising:
a memory to store instructions; and
one or more processors using the instructions stored in the memory to perform operations including:
obtaining at least a portion of a scaffold of a geographic region;
receiving sensor data generated by vehicle sensors of at least one vehicle;
identifying, from the sensor data, a set of sensor measurements for the geographic region taken by the at least one vehicle, the set of sensor measurements including environment geometry data for the geographic region and trajectory data for the at least one vehicle, wherein at least a first portion of the trajectory data corresponds to one or more mapped areas of the geographic region and at least a second portion of the trajectory data corresponds to one or more unmapped areas of the geographic region;

aligning the environment geometry data with the scaffold based on the first portion of the trajectory data, wherein at least a portion of the environment geometry data corresponds to the one or more unmapped areas of the geographic region;

generating a map of the geographic region including the environment geometry data and the scaffold; and navigating a vehicle using the map.

2. The computing system of claim 1, wherein the memory stores further instructions to perform operations including:

aligning subsequent environment geometry data generated during subsequent map builds to the scaffold to update the map of the geographic region.

3. The computing system of claim 2, wherein the memory stores further instructions to perform operations including:

anchoring the map of the geographic region to globally accurate survey control points.

4. The computing system of claim 1, wherein obtaining the scaffold of the geographic region comprises receiving a plurality of scaffold road segments included in a scaffold domain and a plurality of map frame road segments in a map frame domain the scaffold is to support mapping on, and updating the scaffold using the plurality of scaffold road segments and the plurality of map frame road segments the scaffold is to support mapping on.

5. The computing system of claim 4, wherein obtaining the scaffold of the geographic region further comprises mapping the plurality of map frame road segments by creating a latitude and longitude polygon enclosing the geographic region, wherein the map frame domain is a largest connected component of road segments entirely enclosed by the map frame domain.

6. The computing system of claim 5, wherein obtaining the scaffold of the geographic region further comprises running coverage planning and scaffolding algorithms on coverage maps having data that is mappable to equivalent data in the map of the geographic region.

7. The computing system of claim 6, wherein obtaining the scaffold of the geographic region further comprises generating route plans using a list of required, optional, and forbidden lanes to determine a route that visits a required lane in the list of required, optional, and forbidden lanes at least once and does not visit a forbidden lane in the list of required, optional, and forbidden lanes.

8. The computing system of claim 7, wherein obtaining the scaffold of the geographic region further comprises creating absolute accuracy constraints for the scaffold.

9. The computing system of claim 8, wherein obtaining the scaffold of the geographic region further comprises placing logs collected for scaffolding in a log set and selecting from the log set a selected plurality of logs for a map build.

10. The computing system of claim 9, wherein obtaining the scaffold of the geographic region further comprises performing log trajectory estimation and performing a map build using the selected plurality of logs.

11. The computing system of claim 1, wherein obtaining the scaffold comprises creating at least two local scaffolds within the geographic region, wherein the local scaffolds are separated by a threshold distance.

12. The computing system of claim 1, wherein obtaining the scaffold comprises creating a first scaffold within the geographic region and merging a second scaffold within the geographic region with the first scaffold to form a larger scaffold that connects together the first and second scaffolds when the first and second scaffolds are separated by less than a threshold distance.

13. The computing system of claim 1, wherein obtaining the scaffold comprises:

(a) receiving as a seed scaffold at least one lane within the geographic region;

(b) determining a furthest point from the seed scaffold within a road graph of the geographic region;

(c) finding a shortest route from the seed scaffold to the furthest point as part of the scaffold;

(d) determining whether all points in the road graph of the geographic region are within a threshold distance from the scaffold; and (e) when all points in the road graph of the geographic region are within the threshold distance from the scaffold, completing the scaffold; otherwise, repeating steps (b)-(e).

14. The computing system of claim 13, wherein obtaining the scaffold further comprises generating a return route back to the seed scaffold from the furthest point as part of the scaffold, wherein the return route does not follow the shortest route from the seed scaffold to the furthest point.

15. The computing system of claim 13, where the threshold distance is a distance in the road graph of the geographic region that has a highest cost to reach in a cost function used to generate the shortest route.

16. The computing system of claim 13, further comprising a route planner, wherein generating the map of the geographic region including the environment geometry data and the scaffold includes providing routable lanes from the road graph of the geographic region to the route planner along with cost information to generate a coverage plan through the required lanes for the road graph and the route planner generates a set of routes that visits all lanes of the scaffold at least once in a manner that is optimized to reduce a total amount of driving required.

17. The computing system of claim 16, wherein generating a map of the geographic region including the environment geometry data and the scaffold includes splitting the scaffold into routes that take a predetermined amount of time to run and that overlap every designated number of meters along a route.

18. The computing system of claim 16, wherein at least one of the set of routes generated by the route planner is a loop.

19. The computing system of claim 16, wherein generating the map of the geographic region including the environment geometry data and the scaffold includes identifying non-covered lanes that are at distances from overlap regions of routes that are greater than a predetermined threshold distance from the overlap regions of the routes, and the route planner rerunning a route plan with the non-covered lanes as required lanes and previously routed lanes as routable lanes and appending new routes generated for the non-covered lanes to the previously routed lanes.

20. The computing system of claim 1, wherein the memory stores further instructions to perform operations including updating the map, wherein updating the map includes ensuring that no part of the selected plurality of logs that extends outside of a boundary of the scaffold will be incorporated into a new part of the map, limiting updating parts of the map that are part of the scaffold, and ensuring that at least one of the plurality of logs intersects with the scaffold according to requirements including at least one of a number of overlap segments, a distance of overlap, and a threshold distance in a log from the scaffold.

* * * * *